US007351145B1

United States Patent
Ornstein et al.

(10) Patent No.: US 7,351,145 B1
(45) Date of Patent: Apr. 1, 2008

(54) METHOD AND APPARATUS FOR ACCUMULATING BETTING DATA IN GAMES OF CHANCE

(75) Inventors: Marvin A. Ornstein, Ocean Springs, MS (US); Richard B. Hanbicki, Three Bridges, NJ (US)

(73) Assignee: MAO, Inc., Biloxi, MS (US)

( * ) Notice: Subject to any disclaimer, the term of this patent is extended or adjusted under 35 U.S.C. 154(b) by 0 days.

(21) Appl. No.: 09/305,562

(22) Filed: Jun. 8, 1999

(51) Int. Cl.
*A63F 13/00* (2006.01)

(52) U.S. Cl. .................... 463/25; 340/666; 273/309
(58) Field of Classification Search ............ 463/16, 463/20, 12, 13, 25, 26–28; 194/339; 340/666, 340/825; 177/25.17; 273/292–309
See application file for complete search history.

(56) References Cited

U.S. PATENT DOCUMENTS

| 3,590,989 | A | * | 7/1971 | Wittwer | 206/568 |
| 5,718,431 | A | * | 2/1998 | Ornstein | 273/274 |
| 5,770,533 | A | * | 6/1998 | Franchi | 463/16 |
| 5,788,574 | A | * | 8/1998 | Ornstein et al. | 463/25 |
| 5,819,901 | A | * | 10/1998 | Filiberti | 194/202 |
| 6,165,069 | A | * | 12/2000 | Sines et al. | 463/25 |
| 6,517,435 | B2 | * | 2/2003 | Soltys et al. | 463/25 |

* cited by examiner

*Primary Examiner*—Jessica Harrison
*Assistant Examiner*—Aaron Capron
(74) *Attorney, Agent, or Firm*—Terry B. Morris

(57) ABSTRACT

A gaming method and apparatus enabling a casino to track the average amount that a player bets at a gaming table, the total amount of player bets at a gaming table (handle) and the players win/loss experience, by measuring and recording into an electronic file each players bet at each betting station of each table a player frequents. The exact amount of each players bet will be measured by the total chip weight of the relevant bet via assigning a specific weight to each chip denomination wherein no two groups of chips in which a total number chips are different from one another have the same total weight, even though their monetary value may be the same.

61 Claims, 20 Drawing Sheets

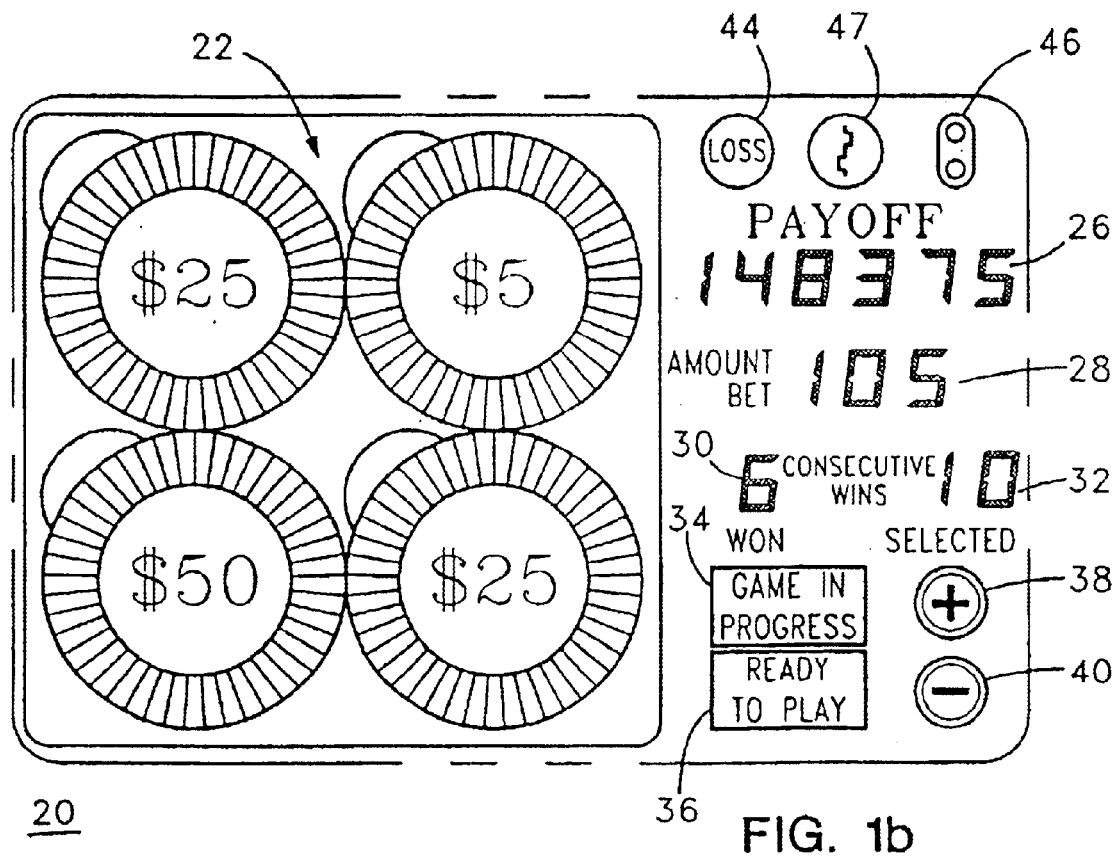
FIG. 1b
KEYSWITCH FUNCTIONS
          
NORMAL OPERATION     RESET     INDICATE STATISTICS
FIG. 1c

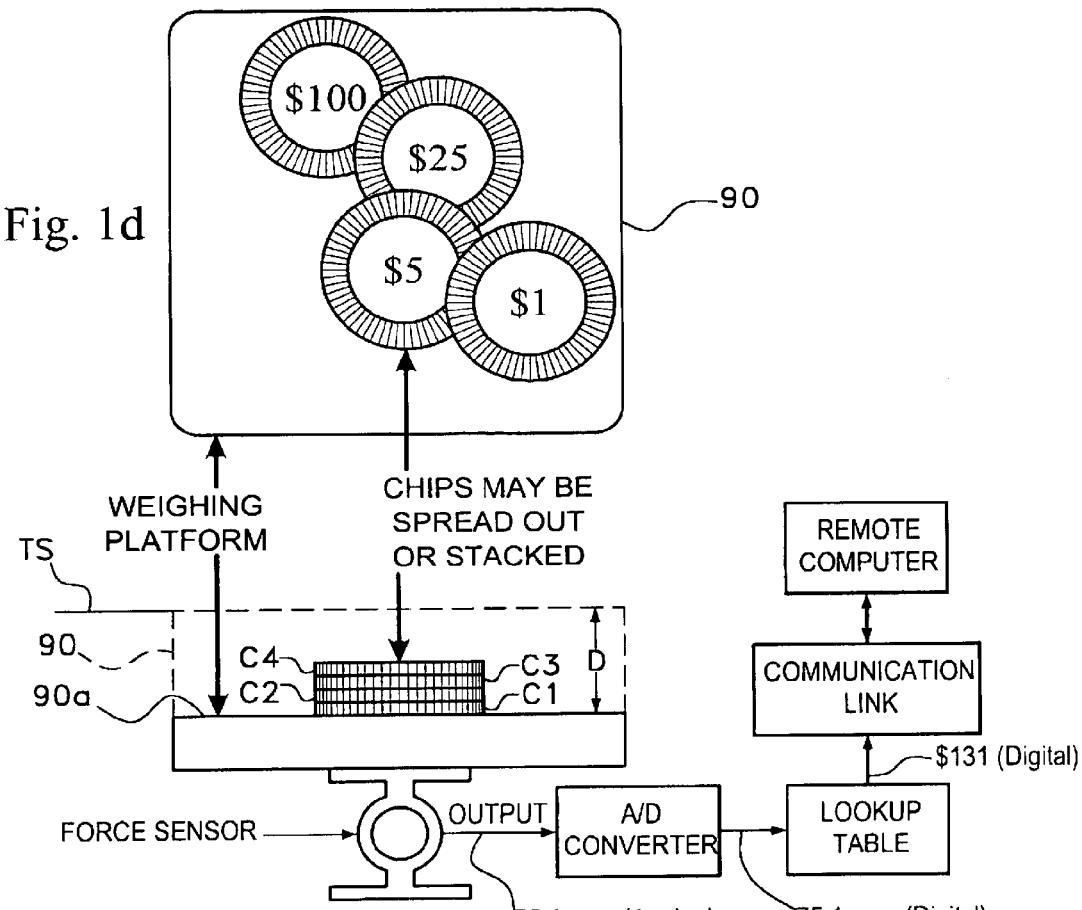
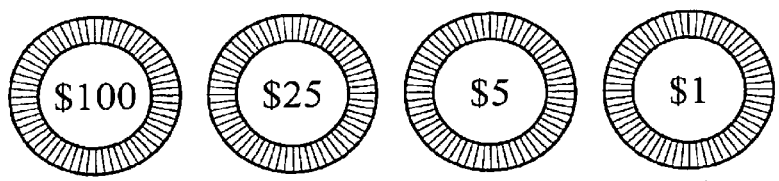
DETERMINING THE VALUE OF A BET
USING VARIABLE WEIGHTS OF CHIPS

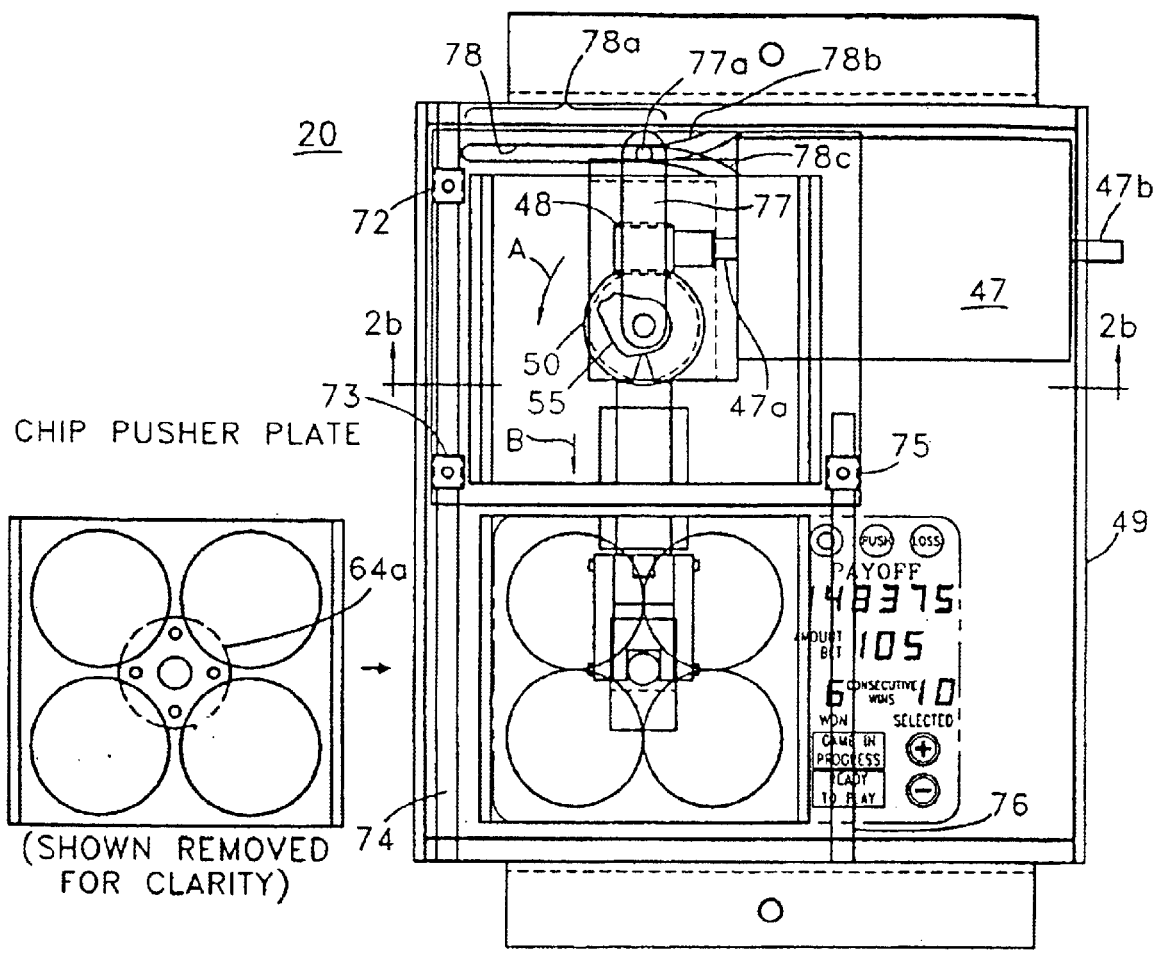

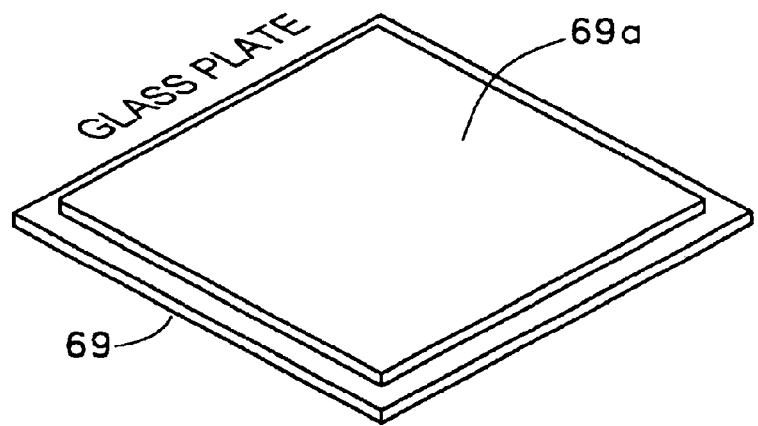
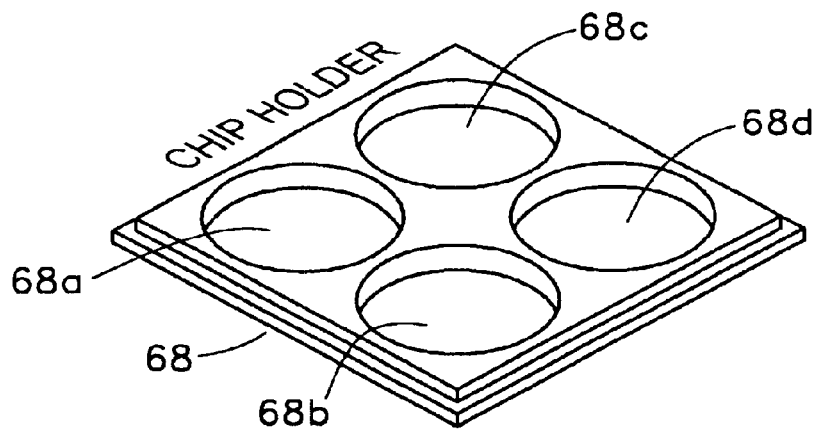
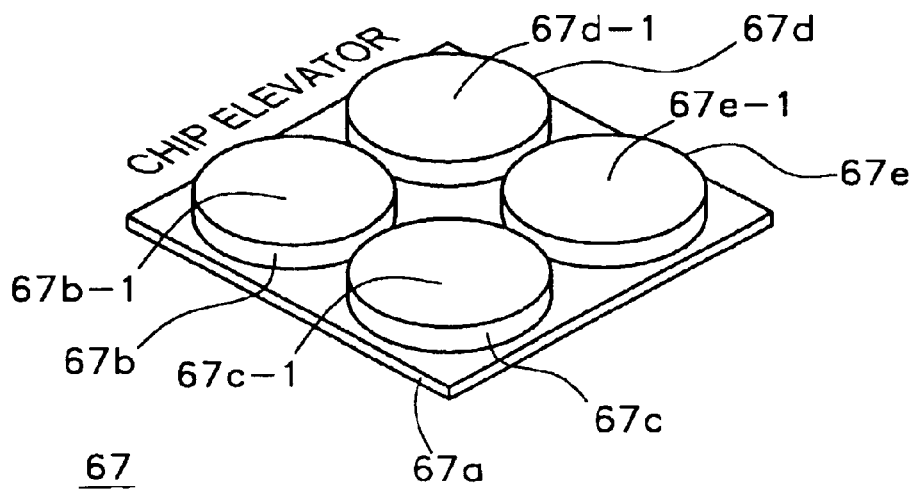
FIG. 4

SEQUENCE OF OPERATION

1. READY TO PLAY
   FIG. 5a

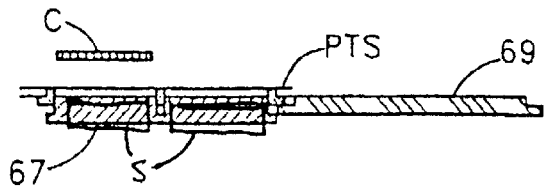

2. 1 TO FOUR CHIPS PLACED INTO DEPRESSIONS
   FIG. 5b

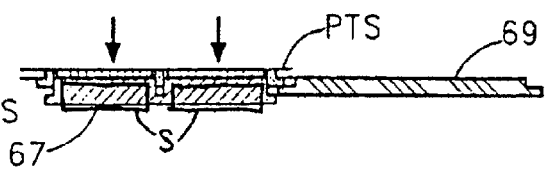

3. CHIPS LOWERED TO ALLOW GLASS PLATE TO COVER THEM
   FIG. 5c

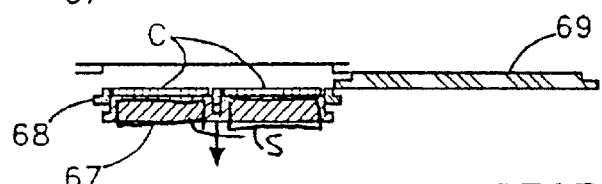

4. GLASS PLATE SLIDES OVER CHIPS TO COVER THEM
   FIG. 5d

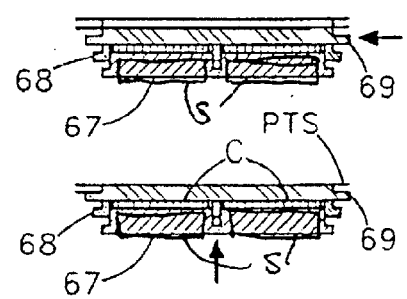

5. PARTS ELEVATE SO THAT GLASS IS FLUSH WITH TABLE SURFACE
   FIG. 5e

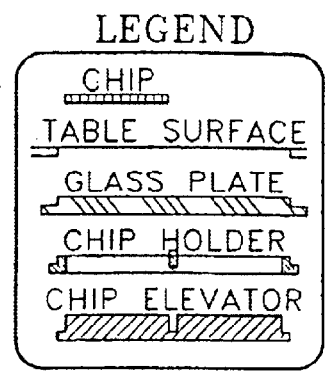

LEGEND
- CHIP
- TABLE SURFACE
- GLASS PLATE
- CHIP HOLDER
- CHIP ELEVATOR

6. PARTS LOWER SO THAT GLASS CAN BE REMOVED
   FIG. 5f

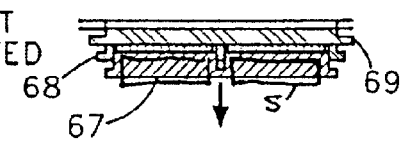

7. GLASS MOVED OUT OF THE WAY
   FIG. 5g

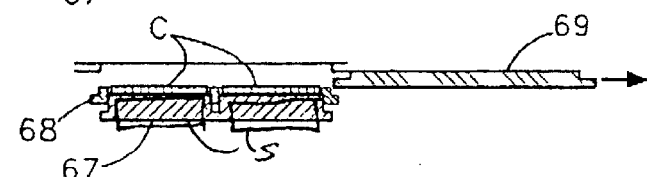

8. PARTS ELEVATE SO THAT CHIPS ARE ABOVE PLAYING SURFACE
   FIG. 5h

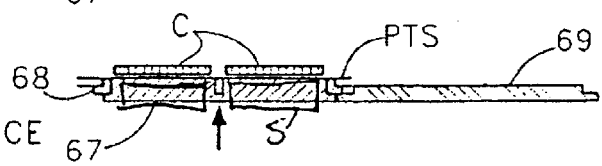

9. GO BACK TO 1 AFTER CHIPS HAVE BEEN REMOVED

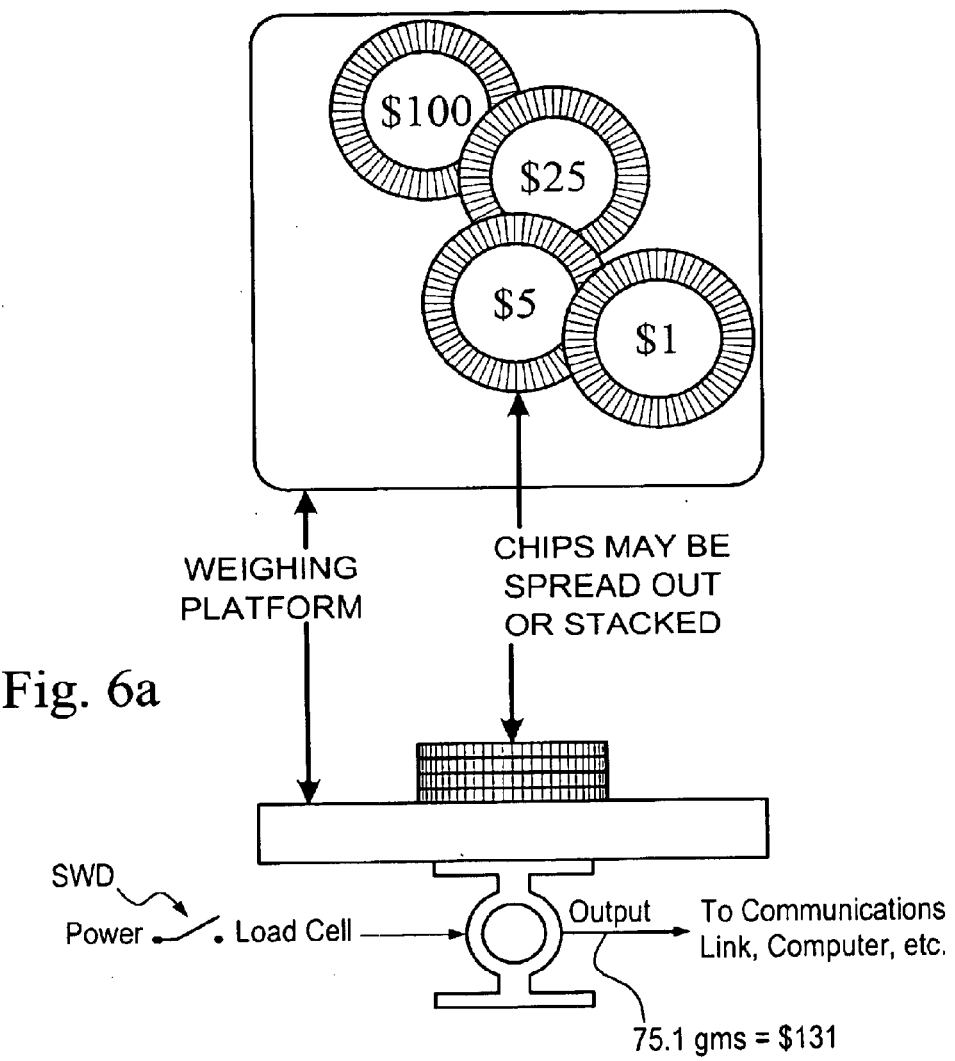
Fig. 6a
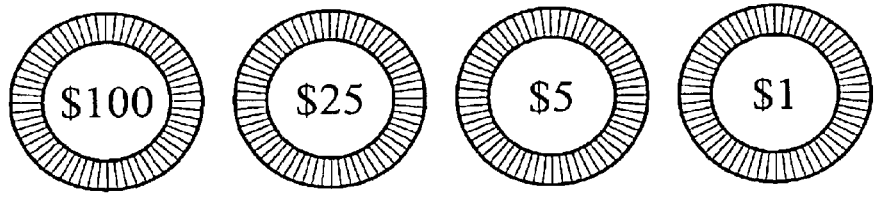
$100 = 36.8 gm   $25 = 16.7 gm   $5 = 11.3 gm   $1 = 10.3 gm
DETERMINING THE VALUE OF A BET
USING VARIABLE WEIGHTS OF CHIPS

VARIABLE CHIP WEIGHT SYSTEM

A = 36.8 gm  $100 Chip
B = 16.7 gm  $25 Chip
C = 11.3 gm  $5 Chip
D = 10.3 gm  $1 Chip 1 oz = 28.35 gm
.4 oz = 11.34 gm

| | |
|---|---|
| 0·A + 0·B + 0·C + 1·D = 10.3 gm | $1 |
| 0·A + 0·B + 0·C + 2·D = 20.6 gm | $2 |
| 0·A + 0·B + 0·C + 3·D = 30.9 gm | $3 |
| 0·A + 0·B + 0·C + 4·D = 41.2 gm | $4 |
| 0·A + 0·B + 0·C + 5·D = 51.5 gm | $5 |
| 0·A + 0·B + 1·C + 0·D = 11.3 gm | $5 |
| 0·A + 0·B + 1·C + 1·D = 21.6 gm | $6 |
| 0·A + 0·B + 1·C + 2·D = 31.9 gm | $7 |
| 0·A + 0·B + 1·C + 3·D = 42.2 gm | $8 |
| 0·A + 0·B + 1·C + 4·D = 52.5 gm | $9 |
| 0·A + 0·B + 1·C + 5·D = 62.8 gm | $10 |
| 0·A + 0·B + 1·C + 6·D = 73.1 gm | $11 |
| 0·A + 0·B + 1·C + 7·D = 83.4 gm | $12 |
| 0·A + 0·B + 1·C + 8·D = 93.7 gm | $13 |
| 0·A + 0·B + 1·C + 9·D = 104 gm | $14 |
| 0·A + 0·B + 2·C + 5·D = 74.1 gm | $15 |
| 0·A + 0·B + 2·C + 6·D = 84.4 gm | $16 |
| 0·A + 0·B + 2·C + 7·D = 94.7 gm | $17 |
| 0·A + 0·B + 2·C + 8·D = 105 gm | $18 |
| 0·A + 0·B + 2·C + 9·D = 115.3 gm | $19 |
| 0·A + 0·B + 4·C + 0·D = 45.2 gm | $20 |
| 0·A + 0·B + 4·C + 1·D = 55.5 gm | $21 |
| 0·A + 0·B + 4·C + 2·D = 65.8 gm | $22 |
| 0·A + 0·B + 4·C + 3·D = 76.1 gm | $23 |
| 0·A + 0·B + 4·C + 4·D = 86.4 gm | $24 |
| 0·A + 0·B + 4·C + 5·D = 96.7 gm | $25 |
| 0·A + 0·B + 4·C + 6·D = 107 gm | $26 |
| 0·A + 0·B + 4·C + 7·D = 117.3 gm | $27 |
| 0·A + 0·B + 4·C + 8·D = 127.6 gm | $28 |
| 0·A + 0·B + 4·C + 9·D = 137.9 gm | $29 |
| 0·A + 1·B + 1·C + 0·D = 28 gm | $30 |
| 0·A + 1·B + 1·C + 1·D = 38.3 gm | $31 |
| 0·A + 1·B + 1·C + 2·D = 48.6 gm | $32 |
| 0·A + 1·B + 1·C + 3·D = 58.9 gm | $33 |
| 0·A + 1·B + 1·C + 4·D = 69.2 gm | $34 |
| 0·A + 1·B + 1·C + 5·D = 79.5 gm | $35 |
| 0·A + 1·B + 1·C + 6·D = 89.8 gm | $36 |
| 0·A + 1·B + 1·C + 7·D = 100.1 gm | $37 |
| 0·A + 1·B + 1·C + 8·D = 110.4 gm | $38 |
| 0·A + 1·B + 1·C + 9·D = 120.7 gm | $39 |
| 0·A + 1·B + 3·C + 0·D = 50.6 gm | $40 |

| | |
|---|---|
| 1·A + 0·B + 0·C + 0·D = 36.8 gm | $100 |
| 0·A + 4·B + 0·C + 0·D = 66.8 gm | $100 |
| 0·A + 3·B + 5·C + 0·D = 106.6 gm | $100 |
| 0·A + 3·B + 4·C + 5·D = 146.8 gm | $100 |
| 0·A + 3·B + 3·C + 10·D = 187 gm | $100 |
| 1·A + 0·B + 0·C + 1·D = 47.1 gm | $101 |
| 0·A + 4·B + 0·C + 1·D = 77.1 gm | $101 |
| 0·A + 3·B + 5·C + 1·D = 116.9 gm | $101 |
| 0·A + 3·B + 4·C + 6·D = 157.1 gm | $101 |
| 0·A + 2·B + 10·C + 1·D = 156.7 gm | $101 |
| 0·A + 2·B + 9·C + 6·D = 196.9 gm | $101 |
| 0·A + 4·B + 0·C + 2·D = 87.4 gm | $102 |

Fig. 6b

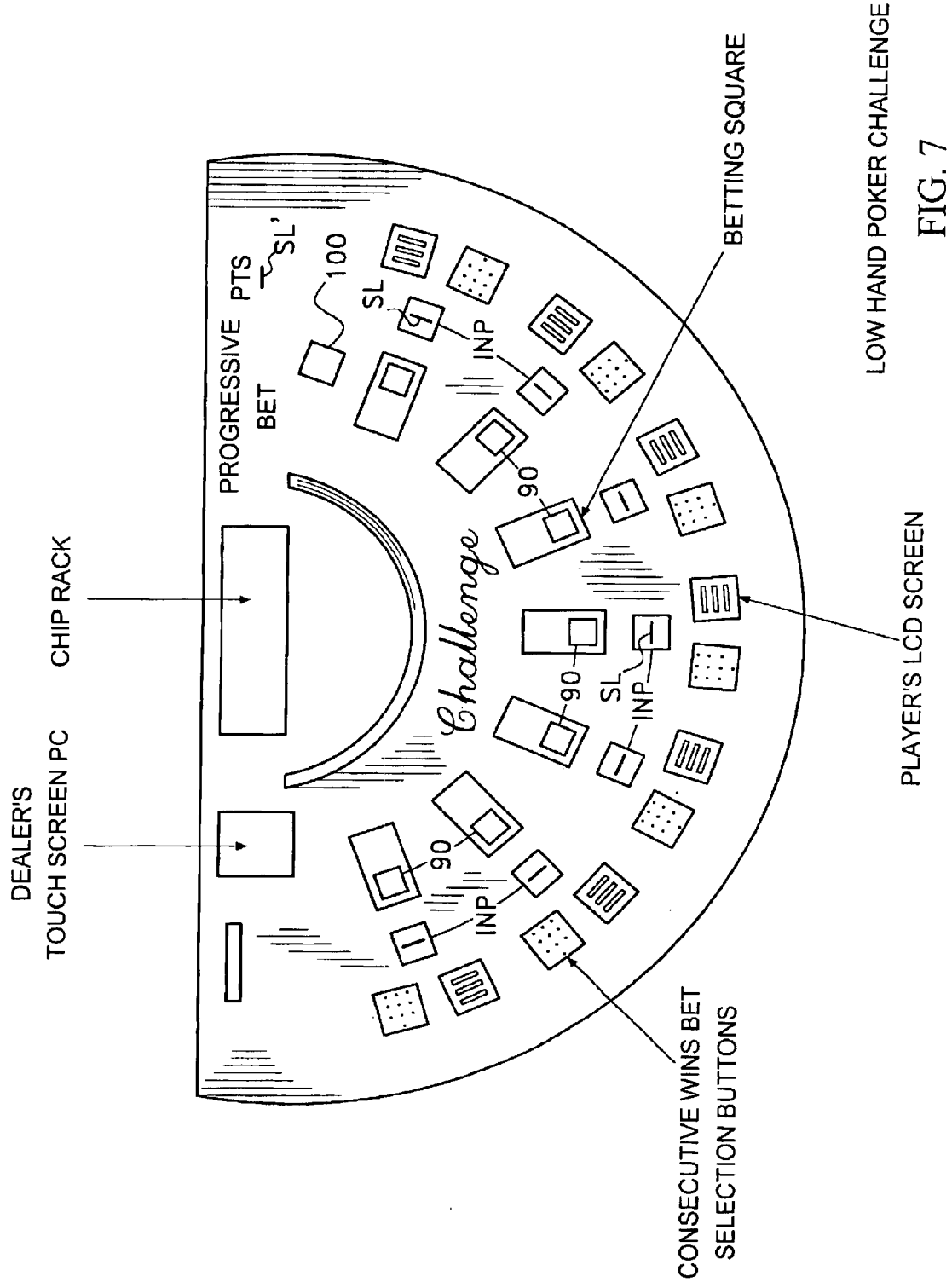
FIG. 7 LOW HAND POKER CHALLENGE

LOW HAND WINS
SLOT CHALLENGE

FIG. 9   FIVE CARD STUD CHALLENGE

FIVE CARD STUD
POKER SLOT CHALLENGE

METHOD AND APPARATUS FOR ACCUMULATING BETTING DATA IN GAMES OF CHANCE

FIELD OF THE INVENTION

The present invention relates to a method and apparatus for playing a betting game and more particularly to a novel method and apparatus for very accurately monitoring and accumulating data of a betting game having integrated thereto a side bet and/or progressive bet capability for increasing the betting possibilities and enhancing player interest.

The present invention further relates to a method and apparatus for monitoring the exact amount bet by a table game player and for receiving/transmitting information gathered by the apparatus to/from electronic interfaces for analysis and/or interactive betting and for allowing the casino and gaming regulators to more accurately measure the true return of table games, individually or collectively, by precisely accounting for exact amounts wagered and won/loss at each betting station on every table game.

BACKGROUND OF THE INVENTION

As is described in detail in co-pending U.S. Pat. No. 5,570,885, issued Nov. 5, 1996, integration of a side bet capability into conventional betting games adds a totally new dimension to such games which, among other advantages includes the capability of providing a larger selection of possible bets as well as significantly increasing the interest of each game played and the newly created relationship of a consecutive number of wins as a result of the selected side bet which increases the interest of all players at a table, even though some of the players have not chosen to make such a side bet. The nature of the side bet also acts as an inducement to continue play at a given table or slot machine, if the relevant casino requires the player to make the conventional bet before the side bet is allowed. The relevant casino has either option. This patent also discloses electronic apparatus for calculating and displaying the payoff of a side bet chosen by a player and continuous monitoring of each game played and identifying either a payout or a non-payout status.

Casinos have historically recognized a need to identify the betting volume of a table player, and the return to the casino from the player's action, in order to understand the true value of the table player so that the casino may either reward, ignore or defense the relevant player. Table players historically have been frustrated by the inability of casinos to accurately measure their play. Casinos have devoted countless hours attempting to visually track non-skilled players for marketing purposes as well as skilled players, who hold a statistical advantage over the casino.

Tracking the betting volume as well as the win/loss results of slot players and slot machines has been available for many years. The player generally inserts a magnetically encoded card in the machine in order to identify himself. The electronic nature of the machine enables information to be collected and then transmitted to an electronic interface for further analysis. The same electronic nature enables the machine to receive information via an electronic interface for control and interactive (progressive) betting purposes.

Historically tracking table game numbers has been difficult because the table games were non-electronic, layout (felt) games. Casinos estimated table game returns and table game volume by recording chips purchased at a table with cash (table drop), credit given to players by exchanging chips for markers, chip transfers to and from the cage as well as the starting chip tray and of course, the counting of cash in the drop box at the end of a given day or shift. The accounting procedures accounted for a profit/loss per table as well as profit/loss per slot machine once drop box cash was counted. But the cash count of drop boxes together with the aforementioned accounting procedures could not produce a reconciliation of profit/loss. Table game volume was never available because of the inability to determine and record the amount of each bet wagered, due to the lack of any electronics available at table games.

Historically the betting volume of an individual player is estimated by averaging the amount of a player's first bet, the relevant table's minimum bet, the player's largest bet and the player's smallest bet. Pit personnel spend a significant amount of time inaccurately tracking the player's action in order to determine the player's value.

Therefore, there has been a need to measure accurately total betting volume and win/loss numbers at each table betting station, at each table and for each identified player. There has also been a need to analyze and understand the aforementioned numbers on a current basis before the shift or day's accounting reflects profit and loss numbers.

BRIEF DESCRIPTION OF THE INVENTION

The present invention is characterized by comprising method and apparatus for monitoring and accumulating betting data, as well as integrating a side bet and/or progressive bet capability into wagering games typically played at casinos and other gaming establishments throughout the world as well as precisely and accurately establishing an amount bet by every player at a table for purposes of collecting of statistical data, betting patterns and habits and storing such data for evaluation to enhance and improve a game to increase player interest as well as monitoring table productivity and also maintaining data on individual players, as well as highly accurately determining the amount bet in such cash bet.

Although prior art apparatus exists which already has the capability to detect and/or identify the denomination and/or presence of the chips (see U.S. Pat. No. 5,788,574), the present invention is characterized by utilizing a weighing mechanism to accurately identify any chip denomination by weight, substantially without a margin of error. The system utilizes chip weight to identify the amount bet in order to calculate payoffs, track unit profit/loss status, track player gambling habits, use in interactive betting (progressive) and in any other way which may be useful when combined with interfaced electronics. Chips employed in the system are uniquely weighted to distinguish each denomination from every other. The total weight of chips placed in a receptacle is converted into a total denomination value. The system employs a highly accurate load cell as a weighing means.

This apparatus represents the first revenue generating electronics to be added to casino table games. The primary purpose of table games is as a revenue generator. This is the first time revenue generating electronics are used to collect, transmit and receive data to enable casino management and regulatory agencies to analyze player gambling habits, precisely determine profit/loss and/or control and/or monitor gaming a table via communication interface. This is also the first time casino chip denominations are each identified by different weights.

In one preferred embodiment, a blackjack game is comprised of a blackjack table which accommodates a dealer and a plurality of players. Each player position is provided with a chip receiving area adjacent each player for making a conventional bet and a key operated, microprocessor-based display. Each player makes a conventional bet prior to the start of play by placing his chip or chips in a chip receiving area, a conventional bet being made prior to the play of new game. In addition, he may place one or more chips in allotted positions of a second chip receptacle also provided at each player's location. Weight detecting sensors, under control of the microprocessor, detect the presence and denominations of the chip or chips placed in the receptacle and, together with the number of consecutive wins selected by the player making such a bet, displays a payoff amount, amount bet, consecutive win number selected and number of consecutive wins attained by each player. The amount of the bet is stored for subsequent analysis.

As an alternative to a player selecting the number of consecutive wins for a side bet, the side bet may be made without a selection of the number of wins to be attempted. The consecutive wins payout will be based on a predetermined payoff which may be posted at or near each electronic or non-electronic game site. The higher the number of successful consecutive wins, the larger the payoff. The minimum number of consecutive wins required before a payoff to a player is permitted, will vary depending on the odds of the relevant bet and the relevant game of chance. The consecutive wins side bet may also include a bonus payment for a lower number of consecutive wins before a higher number of consecutive wins is attained. This side bet version may be best utilized when the odds of a successful consecutive win is significantly greater than a blackjack win, for example, selecting a specific number at roulette at 37 to 1 odds or pre-selecting a 2 or 12 to be rolled in a game of craps at 35 to 1 odds.

This alternative version of "Streak", which is a trademark of MAO Gaming, and which is described above, eliminates the need for an area within the betting box for consecutive wins to be attempted (electronic version) and also eliminates the need for separate betting areas for the number of consecutive wins to be attempted (non-electronic version). The successful number of consecutive wins is terminated by a loss, rather than being limited to a specific number of wins to be attempted.

The current number of successful consecutive wins will continue to be displayed within the betting box on the electronic version of the game; however the non-electronic version of the game eliminates the need for placement of a marker in a higher number of consecutive wins betting area upon the occurrence of each win, and merely requires the addition of a higher numbered marker which is placed on top of or adjacent to the player's bet to reflect the current number of consecutive wins or the addition of a marker on top of the last marker put down next to (or on top of) the player's bet to reflect the current number of consecutive wins.

The chip receiving area for the conventional bet is comprised of a chip receiving surface supported upon an electronic weighing device which automatically converts a weight on the chip receiving surface to a monetary amount representative of the total weight of the chips placed upon the surface. The weighing device may, for example, be a load cell.

The valid chips employed in the game each have a unique denomination and a unique weight, associated with each denomination. The unique weights, in addition to being different from one another, is further unique in that no sum of any plurality of chips is equal to the weight of any other chip or combination of other chips, even though two groups of chips may have the same monetary value, thus, assuring an accurate determination of the total sum of the chips placed upon the conventional chip receiving receptacle.

The unique chip weighing technique selects weights for chips which increase with increasing denomination but which increase at a reduced rate. For example, in one embodiment, the chip representing a one-dollar ($1.00) denomination is assigned a weight of 10.3 grams, whereas, the chip representing a five-dollar ($5.00) chip (total weight 11.3 grams) or five one-dollar ($1.00) chips (total weight 51.5 grams). Although both bets are for the identical amount, the total weights are different and easily discernible.

The weight assignments are fully compatible with the weight sensing devices, which have the ability to distinguish differences of 0.1 gram, the smallest difference in the weight assignment of the preferred embodiment being at least 1.0 gram.

The weight sensor substantially instantaneously converts the weight into a monetary value, and displays and stores the value for use in all of the above-mentioned purposes and evaluations.

Data from each gaming table is preferably, transferred to a central computer through a communications interface, which, in addition to enabling analysis of all data at a central location, further enables a casino-wide, state-wide or region-wide progressive jackpot play. For example, a progressive jackpot continues to build until a player within the progressive jackpot system wins fifteen (15) consecutive games (i.e. a round), for example, at which time the winner is paid off and a new progressive jackpot is initiated. Progressive jackpots create additional interest in the games.

The chip receiving receptacle for receiving a side bet, comprises a receptacle having a plurality of recesses, each adapted to receive a single chip. A weight sensor for each recess, similar to that employed in the conventional bet receptacle, converts each chip weight to a denomination associated therewith further enhancing the accuracy of the system. A cover operated by a dealer seals the chips until the selected number of consecutive games (round) has been won or until that better has lost a game (round) prior to reaching the number of consecutive wins selected by that better.

Play begins when the dealer presses a dealer-operated begin game button which (in one embodiment) automatically covers and seals the side bet chip receptacle with a transparent cover, while enabling the viewing of the chips through the transparent cover.

Each new game (round) is played in the conventional manner. When the game (round) in play terminates, the dealer establishes each of the players at the table as winning or losing or tying the dealer's hand. The conventional bet chips bet by losing players are taken by the dealer when a player has a losing hand. In the event that a player participating in a consecutive win side bet loses a game, the dealer, prior to taking that player's uncovered chips from the table, presses a Loss button on the player's display panel which, in addition to terminating the consecutive win side bet, uncovers the side bet chip receptacle and lifts the chip (or chips) out of the receptacle to facilitate their removal. Once the Loss button is pressed, the display in front of the relevant player is turned off or any other appropriate display may be provided such as, "END OF GAME—PLEASE MAKE NEW BET" or any other appropriate display. The number of consecutive wins presented in a winning player's display participating in a consecutive win side bet is advanced when the dealer presses the game begin button to initiate play of the next hand, unless the dealer has pressed the Push button (player-dealer tie) or the Loss button.

At the option of the relevant casino, the game may include a rule that the player wins if the total of his cards equals the final total of the dealer's cards (i.e. a Push). The Push button will be removed and the payoffs of consecutive wins will be lower than the side bet when neither player or dealer wins with cards of the same total. The lower payoff will incorporate the statistical advantage given to the player when he wins on a "Push".

The side bet chip receptacle remains covered until the occurrence of either a lost hand before the number of consecutive wins selected is achieved or the number of consecutive wins is achieved. The cover prevents the bet from being changed and provides a constant reminder of the consecutive wins side bet as each successive hand is played, regardless of the number of consecutive wins selected by the player. The receptacle cover is transparent to permit easy viewing of the chips in the side bet chip receptacle. The individual microprocessor at each player location automatically locks out the player's keyboard when the play of the first game following the selection of the consecutive win side bet begins. No change can be made in the number of consecutive wins selected until the player either achieves the number of consecutive wins or has failed to achieve the number of consecutive wins due to a loss of a hand prior to achieving the selected number of consecutive wins.

In another embodiment, both the conventional bet and the side bet receptacle need not be covered. However, the amount of the bet determined by the combined weight of the chips making up the bet, is stored in memory at the start of a new game (round). Any change in the weight in a receptacle during play is automatically detected by periodically comparing the initially stored value to initiate an alarm condition, if necessary. Both chip receptacles are preferably recessed to prevent accidental movement of the chips during a play of a game while enabling simple and easy removal of the chips from their receptacles at the end of a game.

In other embodiments, the side bet apparatus is integrated into the playing table and/or apparatus. For example, in slot machine embodiments playing video poker, video roulette, video 5-card stud, video low ball poker, video craps, video baccarat, etc. or in slot machines which randomly present one or more sets of three symbols, such as fruit, the key operated display may either be adjacent to or integrated into the slot machine housing for selection of the number of consecutive wins. This data may be transferred to a central computer which polls each slot machine to collect the data and is especially advantageous for use in progressive bets. The slot machine sensors conventionally employed in slot machines (which do not require weight sensors), sense deposit of a coin or coins for the side bet, in addition to the deposit of a coin or coins for a single play. The sensor cooperates with the microprocessor to display the payoff amount selected by the player in the event that the player achieves the selected number of consecutive wins.

The machine, upon completion of a game, automatically terminates the consecutive wins side bet in the event that a loss occurs before achieving the number of consecutive wins. Each time a new game is initiated and, assuming that there has been no intervening game which the player has lost, the number of consecutive wins displayed is incremented by one, the constant updating apprising the player of his progress during the side bet period.

In casinos permitting a consecutive wins bet to be made without betting on a hand, the "side bet" becomes the only bet.

Casinos may provide players with card/keys inserted into a reader unit at each player position at a gaming table, enabling the casino to compile data on participating players for awarding perks, as well as determining betting habits of such players.

The accuracy of the multi-chip sensor receiving conventional bets is more than sufficient for purposes of compiling the statistical data regarding play at each table. However, greater precision is required when the exact amount of a bet must be known. By employing a weight sensor for each chip placed in the side-bet region, the accuracy is significantly enhanced, since each sensor need only recognize the presence and denomination of one chip in the receiving slot during the cardholder's play at the game.

Table action of players not possessing a card/key is gathered together with those of the identified players, providing an accurate and continuous record of the activity at each table (or machine). Removal of a card/key at a station while play resumes at that station identifies the station as being occupied by an unidentified player. Players wishing to obtain the benefits of casino rated play are each provided with an identification card which may be a magnetically or optically encoded card or key or a smart card. A betting box at each player's position, or, in the case of a video type game, a suitable slot (or slit) may be provided to receive the identification member which may be inserted or swiped through the receiving slot. The card/key preferably remains. The system has the capability of compiling and analyzing data for unidentified players, card/key holders and overall play at a table (or machine).

OBJECTS OF THE INVENTION

It is therefore one object of the present invention to provide a novel method and apparatus for a game of chance wherein the chips bet are sensed to determine presence and denomination employing electronic weighing means.

Another object of the present invention to provide a novel method and apparatus for enhancing the interest and excitement in a game of chance by incorporating a consecutive wins bet capability, the selection of which is totally at the whim of and under control of a player, and wherein the chips bet are sensed to determine presence and denomination employing electronic weighing means.

Still another object of the present invention is to provide novel method and apparatus for enhancing the interest and excitement in a table game of chance wherein the tables (or machines) are interfaced in a casino-wide, state-wide or region-wide network to form a progressive jackpot.

Still another object of the present invention is to provide novel method and apparatus for enhancing the interest and excitement in a game of chance through the incorporation of a side bet capability permitting a player to select a variable number of consecutive wins and wherein the game of chance may include anyone of blackjack, craps, roulette, baccarat, five card stud, poker, low ball poker played either at a table or video or other types of slot machines and indicate wherein the tables (or machines) are interfaced in a casino-wide, state-wide or region-wide network to form a progressive jackpot.

Still another object of the present invention is to provide novel method and apparatus for accurately identifying the presence and denomination of playing chips.

Still another object of the present invention is to provide novel method and apparatus for integrating a side bet capability into a game of chance which utilizes a chip receptacle for receiving, identifying the denomination of and covering chips bet in a consecutive win side bet with a transparent cover to provide a constant, observable reminder of the amount bet and provide a secure system to prevent player dishonesty and/or player/dealer collusion by eliminating any opportunity to add or remove chips during play.

Still another object of the present invention is to provide novel method and apparatus for integrating a side bet capability into a game of chance and which utilizes a chip receptacle for retaining chips therein during the number of plays occurring over a side bet period and for highly accurately identifying the presence and denomination of chips placed in the chip receptacle.

Still another object of the present invention is to provide novel method and apparatus for monitoring table play at a gaming table to accurately identify and store the amount of bets at a table to enhance the development of data employed to analyze table play, player betting habits and to determine the nature and extent of perks provided to players.

Still another object of the present invention is to provide novel method and apparatus for gathering table play data for detailed analysis of card/key holders at the table.

BRIEF DESCRIPTION OF THE FIGURES

The above as well as other objects of the present invention will become apparent when reading the accompanying description and drawings in which:

FIG. 1b is a plan view showing an alternative arrangement of the unit of FIG. 1.

FIG. 1c shows the positions to which the keyswitch of FIG. 1b can be set.

FIGS. 1d and 1e respectively show a weighing area for chips and a simplified diagram of a weighing system of the present invention for weighing a plurality of chips.

FIG. 2a shows a top plan view of the electromechanical mechanism utilized to operate the chip receptacle forming part of a player's side bet unit as shown in FIG. 1.

FIG. 2c shows a top plan view of the chip receptacle portion of the player's side bet unit of FIGS. 1 and 2a, showing a manner in which the presence and value of a chip is determined.

FIG. 4 shows an exploded perspective view of the chip elevator, chip holder, and glass cover plate to further clarify the operation thereof.

FIGS. 5a–5h are simplified views showing various stages of the chip receptacle, chip elevator and transparent cover plate and which is useful in explaining the sequence of operation thereof.

FIG. 6a shows a simplified circuit diagram of the chip detection/denomination circuitry for weighing a single chip.

FIG. 6b is a table identifying the weights assigned to chips detected by the circuitry of FIG. 6a.

FIGS. 7–11 show views of other games embodying the side bet system of the present invention.

DETAILED DESCRIPTION OF THE INVENTION AND PREFERRED EMBODIMENTS THEREOF

Figure 1:
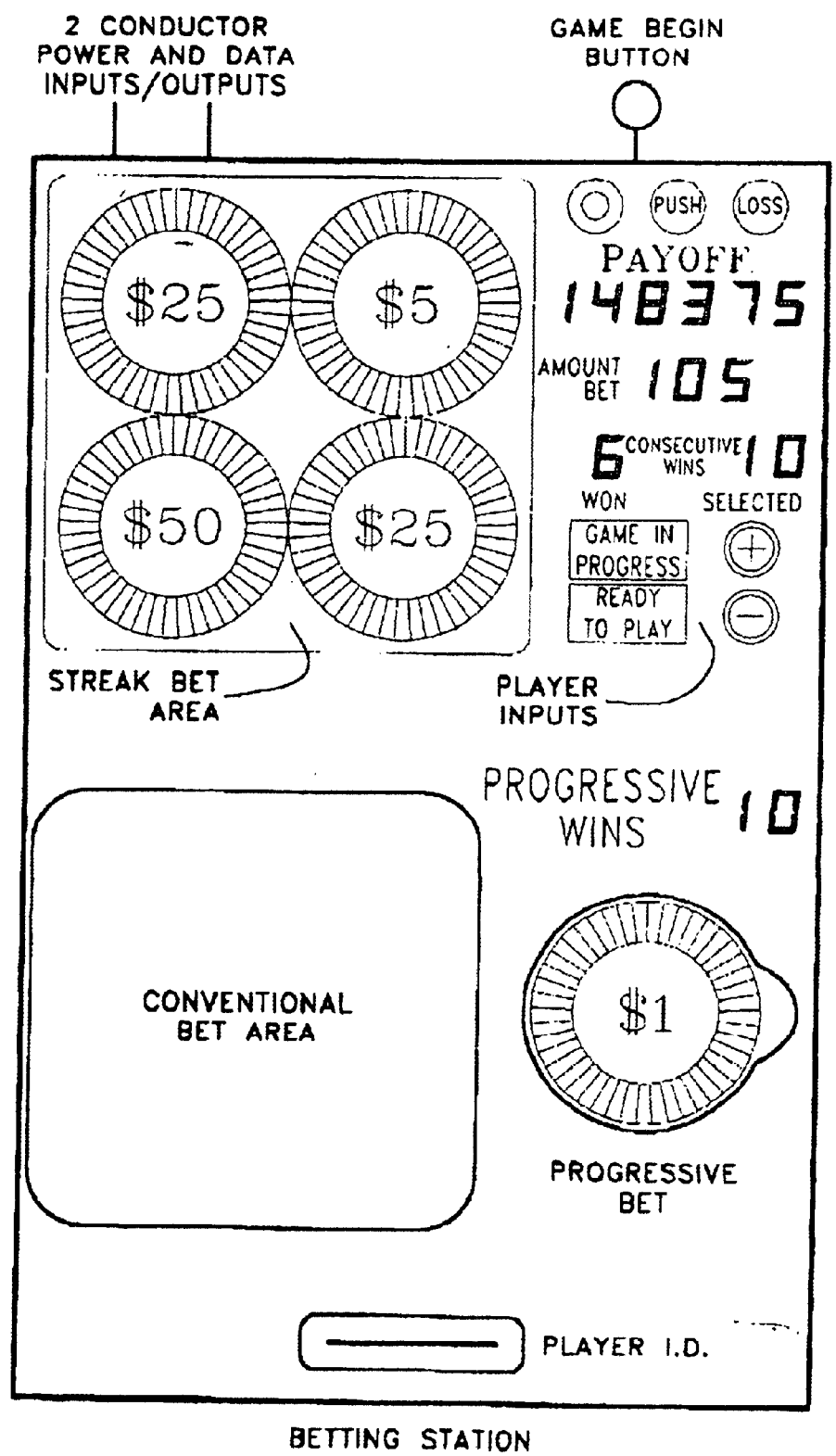
FIG. 1 is a plan view of a side bet layout for a single player which is designed in accordance with the principles of the present invention and further showing the manner in which the players side bet unit interfaces with the dealers game begin button.

FIG. 1 shows a plan view of the side bet layout 10 embodying the principles of the present invention. The side bet layout 10 may be employed in any one of a variety of different games of chance such as, for example, blackjack.

Making reference to U.S. Pat. No. 5,570,885, assigned to the Applicant herein, and which is incorporated herein by reference thereto, a blackjack table layout is shown in FIG. 1 thereof, reference being made thereto for purposes of brevity. In place of the touch screen computer interface 22 shown therein, each player's position 12 is provided with a rectangle 15 at which a player's side bet unit 20 is located.

For the sake of simplicity, only one player's side bet unit is shown in FIG. 1, it being understood that a plurality of such side bet units are provided, one for each player's position 12.

Each side bet unit 20 is coupled to a common power supply 12 and a dealer's game beginning button 14, the power supply 12 and dealer's game begin button 14 being coupled to each other player's side bet unit through the connections as shown.

A unique arrangement is provided for powering the electronics at each gaming table and utilizing the new power supply circuit as the means for transferring data from each gaming table to a central location. Making reference to FIG. 1j, one table location is represented by dotted rectangle capital TA. A central 24 volt D.C. source identified as Pit Control, or, in abbreviated fashion, PC, applies 24 volts D.C. to each table. In the event that the main DC source PC fails for any reason, each gaming table is provided with a D.C. battery B which is constantly recharged by the central DC source PC when it is operating normally and, which battery B provides power for the Table Electronics of table TA in the event of the failure of the central DC source capital PC.

Figure 1A:
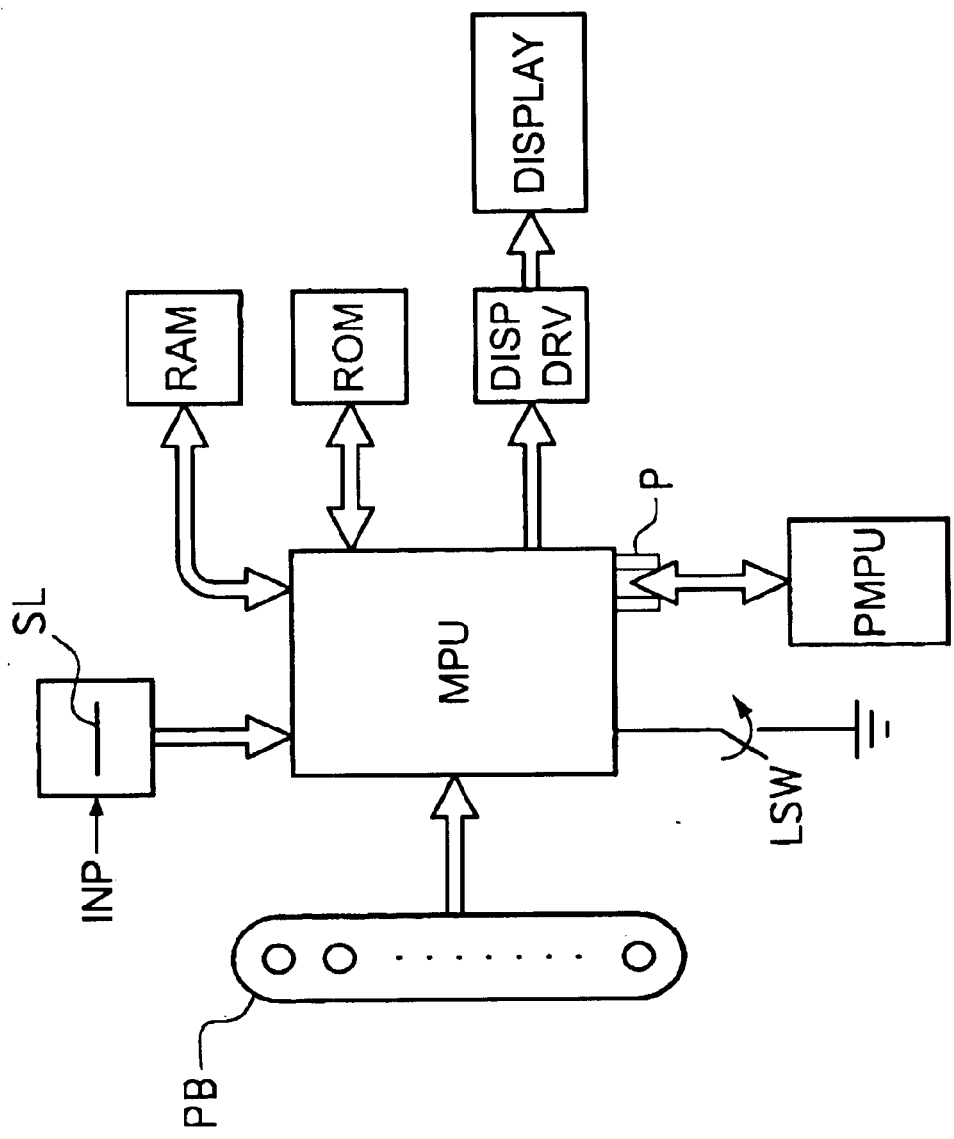
FIG. 1a is a block diagram of the controller means for operating each betting unit of the type shown in FIG. 1.

DC power is supplied to the table electronics for table TA, for example, the table electronics shown in FIG. 1a, by either battery B or main DC source PC, through a pair of leads LA. Pit Control Data Buffer (PDA), which may be provided for each table or for a plurality of tables, has data transferred thereto from the MPU shown, for example, in FIG. 1a, on a periodic basis. Each MPU (FIG. 1a) transfers the data including the bets wagered as well as other statistics, players identified by the key/cards, as well as other data, together with an identification of the table from whence it came. The data is transferred through a pair of leads LB to buffer PDA. The capacitors C isolate DC from the data lines.

Figure 1F:
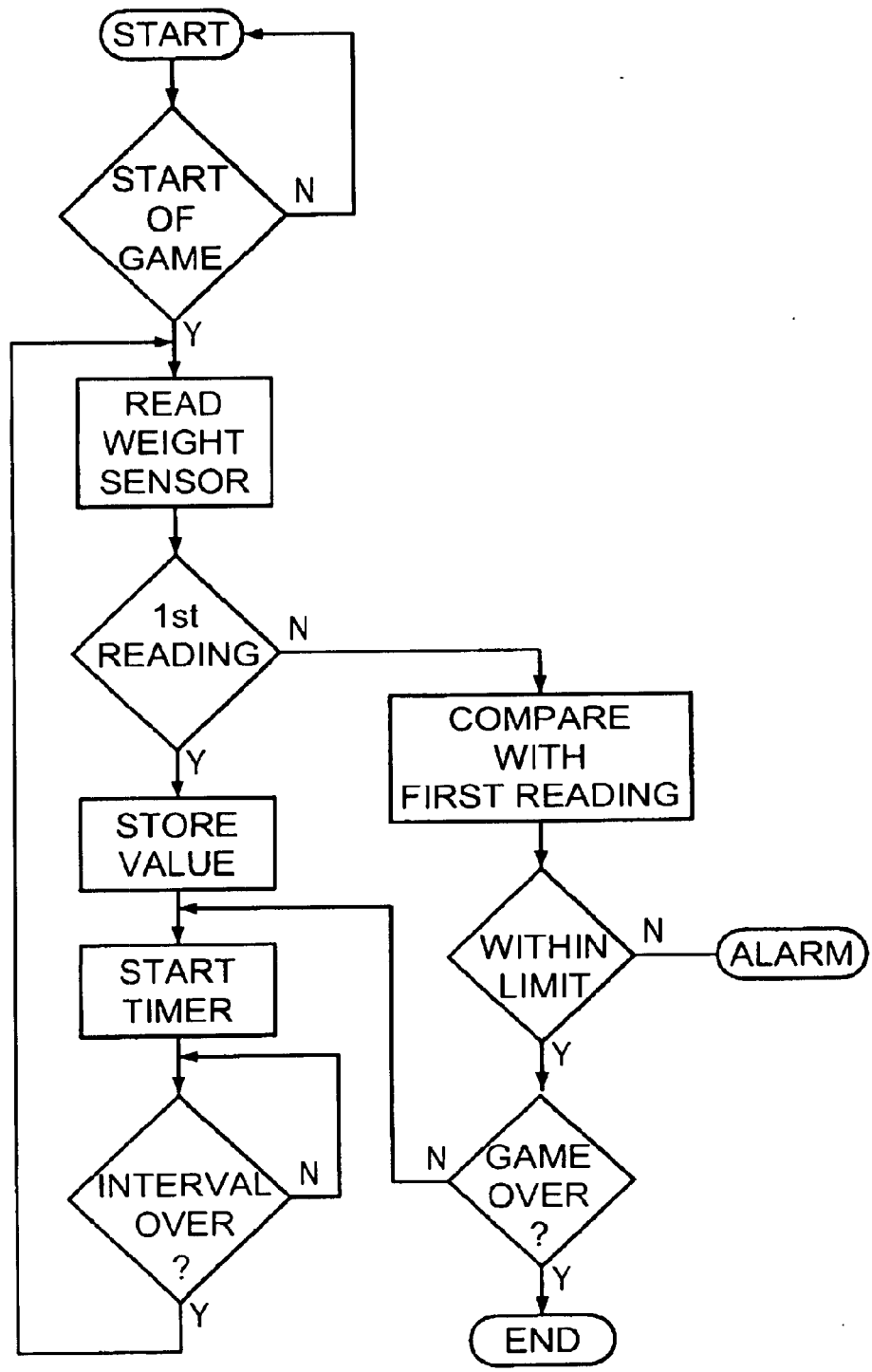
FIGS. 1f and 1g are flow diagrams useful in explaining the operation of the present invention.
Figure 1G:
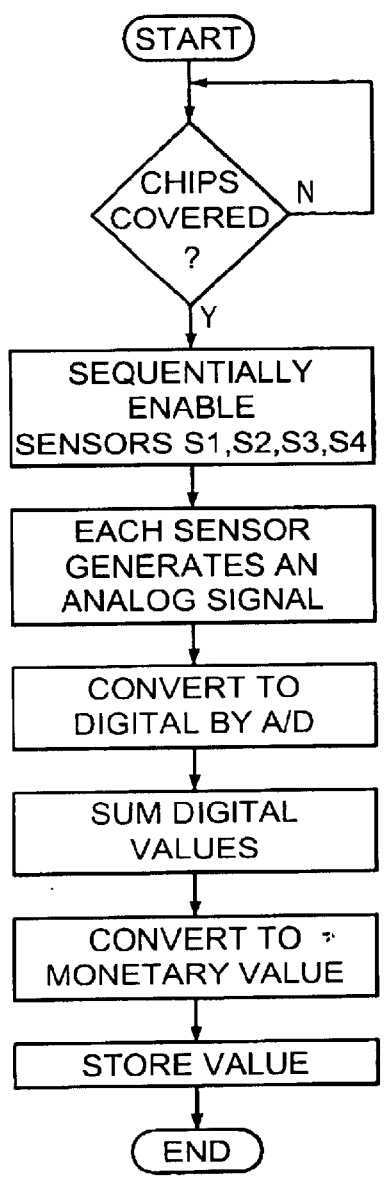
Figure 1H:
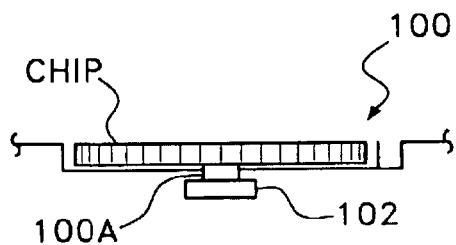
FIGS. 1h and 1i, respectively, show a sectional and a top view of a progressive jackpot receptacle.
Figure 1I:
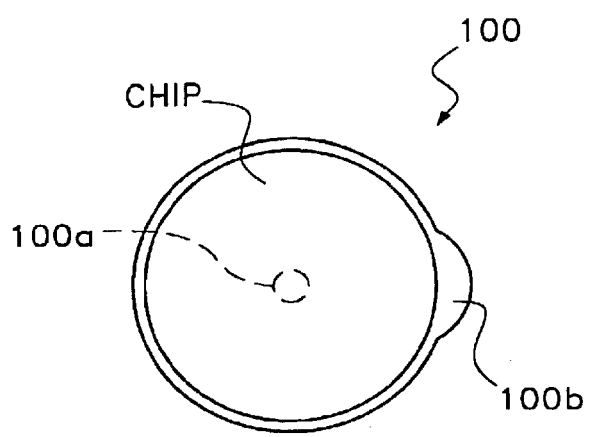
Figure 1J:
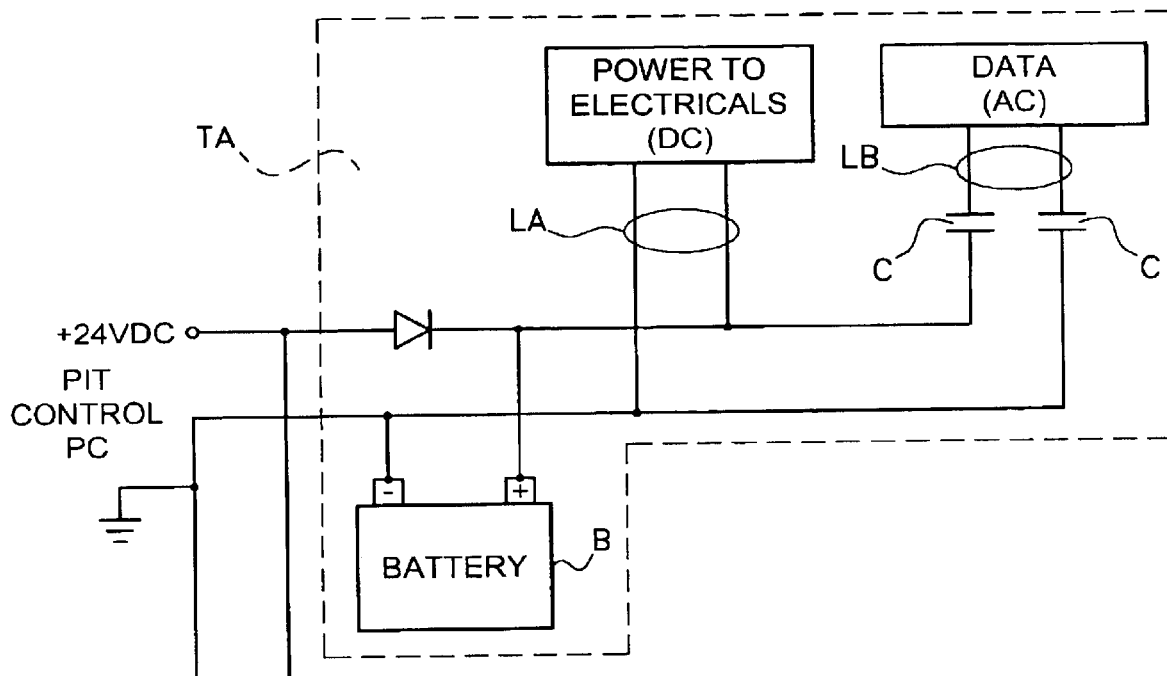
FIGS. 1j and 1k respectively show an electrical circuit and a flow diagram, which are useful in explaining the manner of powering/transfer of data obtained at individual games within a casino, for example.
Figure 1K:
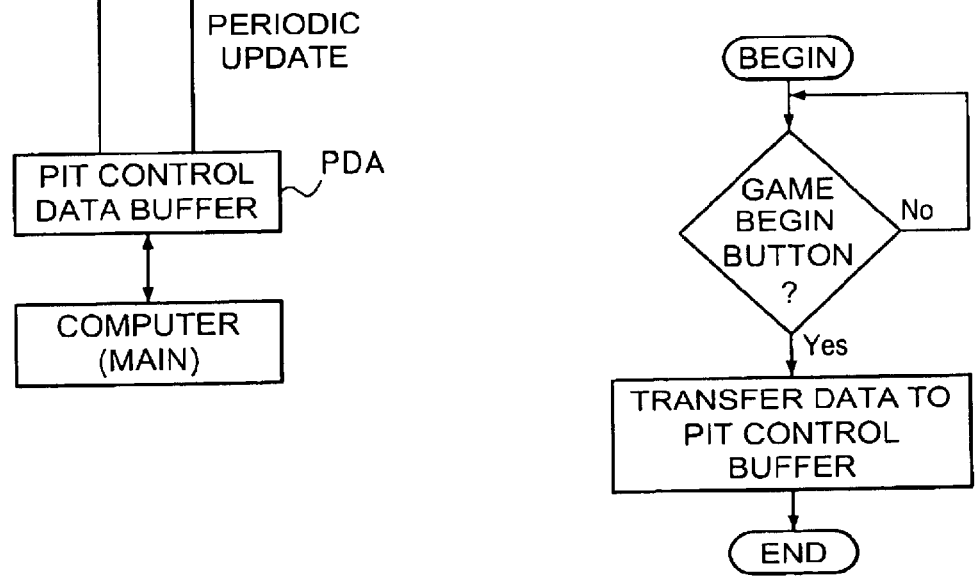

One typical, but by no means exclusive, program which may be utilized for data transfer is shown in FIG. 1k. When the system is turned on the MPU (FIG. 1a) looks to determine if the game begin button has been depressed. The MPU loops until the game button is depressed. When the game button is depressed, date is transferred to the Control Data buffer. The program then returns. If desired, data may be transferred when the game ending button is depressed, as one alternative. Other techniques may be utilized such as based on predetermined time intervals (i.e., every 20 minutes) or based upon actual clock times, for example, every 30 minutes on the clock (8:30;9:00;9:30; etc.). The data accumulated may include progressive bets that are collected for a large group of tables which may include an entire gaming casino or a plurality of gaming casinos with in a given region.

Since all of the player's side bet units are identical in both design and function, only one unit, namely, the unit 20 of FIG. 1, will be described herein in detail.

The side bet unit 20 includes a chip receptacle 22 and a key operated LCD (or LED) display unit 24 comprised of a payoff display 26 an amount bet display 28, a number of consecutive wins display 30 and a number of consecutive wins selected display 32 as well as a game in progress display 34 and a ready to play display 36.

Each side unit bet 20 is further provided with "+" and "−" push buttons 38 and 40 as well as a Push key 42 and a Loss key 44.

A player's side bet unit 20, briefly, operates in the following manner:

Prior to the play of a new game and assuming that a player is not already engaged in a consecutive win side bet, chip receptacle 22 is open for the receipt of up to four chips of any denomination. However, a receptacle for receiving a greater or lesser number of chips may be provided, if desired. The player at side bet unit 20 selects the number of consecutive wins by operating buttons 38 and 40 to respectively either increase the number or decrease the number of consecutive wins selected, which is displayed at 32.

It being understood that a player is also obliged to place a wager on the game itself preparatory to beginning a play and assuming that all of said wagers of the players at the table have been completed, the dealer presses the game begin button 14 causing the chips in the receptacle 22 to be lowered and a transparent cover to seal the receptacle, preventing removal of the chips while at the same time permitting their unobstructed observation.

As an alternative, the relevant casino may choose to allow the side bet without the player making the conventional bet. If so, the player is dealt cards as if he had made the conventional bet. The "side bet" then becomes the only bet.

The "ready to play" display 36 which need only be a backlit panel having the words "READY TO PLAY" imprinted or otherwise provided thereon and which is illuminated when a previous game has been completed, and the transparent cover is removed from the chip receptacle turns off when the dealer's game button 14 is depressed. Display 34 which may also be simply a backlighted panel that lights up to indicate that the game is in progress. Presuming that this is the start of the first game at which the player has made a consecutive win side bet, display 30 will read "0" while display 32 displays a number of consecutive wins selected by the player. The payoff display indicates the payoff, which is a function of the number of consecutive wins selected and the amount bet. As soon as the dealer's game button 14 is depressed, the microprocessor controlling side bet unit 20 locks out keys 38 and 40, which keys remain locked out until either the number of consecutive wins in display 32 is achieved or in the event that there is an intervening loss of a game prior to reaching the number of consecutive wins selected. The transparent cover is also placed over the chip receptacle.

As an alternative to a player selecting the number of consecutive wins for a side bet, the side bet may be made without a selection of the number of wins. When a player making such a side bet wins the conventional game (blackjack, for example), a marker (lamer) is placed on the side bet indicating the number of games won (for example, a lamer labeled "1"). As each consecutive game is won by the player, the last marker is replaced by a marker representing the present number of consecutive wins (for example, a lamer labeled "2")

As an alternative to a player selecting the number of consecutive wins for a side bet, the side bet may be made without a selection of the number of wins to be attempted. The consecutive wins payout will be based on a predetermined payoff which may be posted at or near each electronic or non-electronic game site. The higher the number of successful consecutive wins, the larger the payoff. The minimum number of consecutive wins required before a payoff to a player is permitted, will vary depending on the odds of the relevant bet and the relevant game of chance. The consecutive wins side bet may also include a bonus payment for a lower number of consecutive wins before a higher number of consecutive wins is attained. This side bet version may be best utilized when the odds of a successful consecutive win is significantly greater than a blackjack win, for example, selecting a specific number at roullette at 37 to 1 odds or pre-selecting a 2 or 12 to be rolled in a game of craps at 35 to 1 odds. The odds for the present number of consecutive wins may be displayed. The side bet chips are placed in the receptacle 22 for identification of their monetary value. The side bet may be a consecutive wins and/or progressive wins bet. A progressive wins bet may include: the tables in a casino or a group of casinos in a state or region.

As an additional attraction, the consecutive wins feature may also be used as a bonus to the player's conventional bet rather than a sidebet. Employing this alternative, the player is not required to make a sidebet but will receive a bonus after achieving a given number of consecutive wins. The consecutive wins bet may also be made independently of a conventional bet, as may be governed by the rules of the particular casino.

Figure 11:
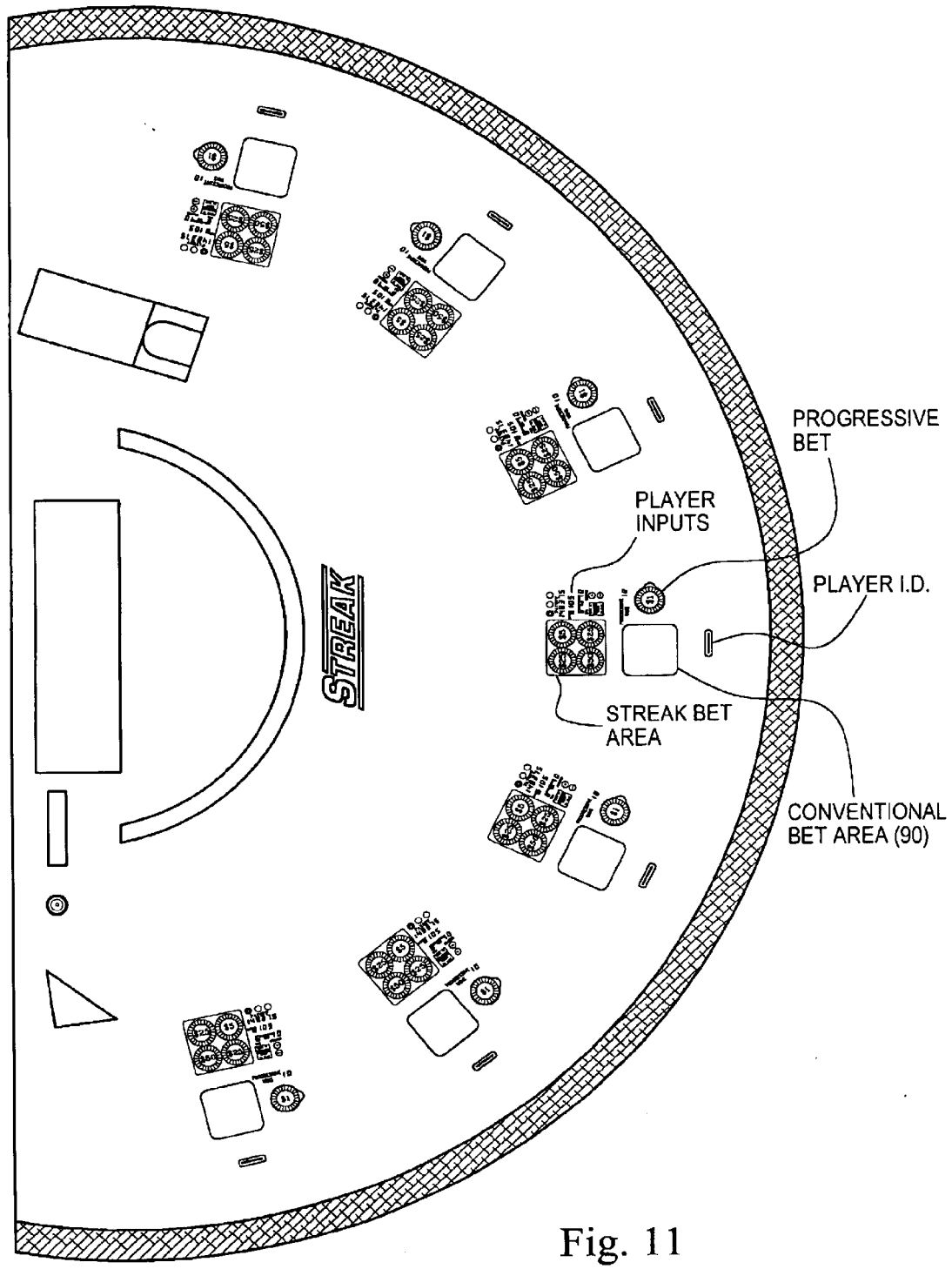

FIGS. 1*d* and 1*e* show an area 90 on a table surface TS for receiving chips for making a conventional bet, also, identified as a "Conventional Bet Area" the location of the area for each player being shown in FIG. 11 (the game being played in FIG. 11 being blackjack). Area 90 has a size sufficient to receive up to as many as 25 chips or more. FIGS. 1*d* and 1*e* show four chips C1, C2, C3, C4, placed one upon another, for example.

The floor 90*a* of area 90 comprises a weighing platform, also shown in FIG. 1*e*, for detecting the presence and total sum of the chips C placed in the area 90. The chips may be spread out within area 90 or may be stacked (in one or more stacks). The chips need not be neatly stacked, so long as they are placed within area 90.

The total monetary amount of the chips in receptacle 90 is determined by weighing the chips upon a load cell L according to specific weights assigned to each denomination.

FIG. 6*b* is a table showing the weights assigned to chips of four (4) different denominations ($1.00; $5.00; $25.00; and $100.00). The assigned weights are unique to each chip and the sums of chips bet are chosen in such a unique fashion that the total weight measured is different for the same total amount even when different chip denominations are used to make up the same monetary amount. As examples, using the assigned weights of FIG. 6b for $1.00; $5.00; $25.00; and $100.00 chip denominations, a $5.00 bet using a $5.00 chip has a total weight of 11.3 grams, whereas a $5.00 bet made up of five (5) $1.00 chips has a total weight of 51.5 grams. A $30.00 bet may be comprised of a $25.00 chip and a $5.00 chip for a total weight of 28 grams; six (6) $5.00 chips for a total of 67.8 grams; thirty (3) $1.00 chips for a total of 309 grams. It can thus be seen that each weight sum of chips totaling a bet of the identical amount is of a different weight when chips of different denominations are employed to make a bet of equal monetary amount. The size and outer appearances of all chips are the same, except for the coloring and indicia denoting their monetary value and are "weighted" internally.

The weighted chip system is substantially cheat proof in that any effort to "weigh down" the scale, for example, by pressing down the weighing platform directly or pressing down a chip or chips on the weighing platform will most likely reduce (rather than increase) the total monetary value of the chips on the platform, since increasing the total weight typically reduces the total monetary value. In addition, the look-up table stored in memory provides an alert signal if the weight is outside of a given tolerance range, typically ±1.0 to 1.5 grams. Also, it is extremely difficult for anyone to accurately apply pressure which would equal the exact weights of valid betting chips. In addition, as shown in FIG. 1f, the computer is programmed to store a total value in memory and to read the weight sensor at periodic intervals during the play of a game. If any change of 0.50 grams or more is detected between successive reading intervals, the system gives an alert signal.

The weight sensor is, in one preferred embodiment, a load cell, such as a standard force sensor. However, any other suitable weighing mechanism having like accuracy and which is small and compact, may be used.

The foregoing chip weight assignments shown in FIG. 6b is merely exemplary and variations in chip weights may be introduced by increasing or reducing chip weights for cosmetic or other reasons without reducing the ability of the weighing system to accurately identify the sum of a bet comprising two (2) or more chips.

The use of the unique weighing system in combination with the assigned weights of the chips provides players with a greater range of bet choices, enabling odd dollar bets to be made, due to the accuracy of the system. Also, casinos are able to more accurately understand the true return of table games individually or collectively.

The play of the blackjack game proceeds in a conventional manner, players winning being paid off while the chips of losing players are removed from the table by the dealer.

The dealer presses the Loss button 44 of the player's side bet unit in the event that the player has lost a game. If the number of consecutive wins has not been achieved because a loss occurs, the microprocessor associated with the player's side bet unit 20 terminates the side bet, uncovers the chip receptacle 22 and elevates those chips in the receptacle to a level above the table to permit their removal.

Assuming that a player at side bet unit 20 has won a hand, upon occurrence of the play of the next game which is initiated by each player providing a wager for the game, the dealer operates the game begin button 14 which automatically advances the number of consecutive wins presented in display 30. However, if the dealer has pressed the Push button 42 because the totals of the dealer and player hands are equal, the number of consecutive wins presented in display 30 will not increase after the game begin button 14 has been pressed by the dealer. As indicated above, the relevant casino may include a rule that the player wins the "Push" or tie. If so the Push button 40 is removed, ignored or disconnected from the controller and payoffs of consecutive wins are reduced to incorporate the statistical advantage otherwise given to the player. The subsequent games are played in a similar manner.

Assuming that the player at unit 20 has achieved the selected number of consecutive wins, the microprocessor associated therewith will present the same numbers in display 30 and 32 and simultaneously therewith will provide, by means of either an alarm or a visual means or both, that a side bet has been won. For example, an audible alarm can be accompanied by flashing one, more than one or all of the displays on the side bet unit. Depending upon the amount and depending upon whether a tax I.D. number is required, the payoff will be performed either at the game table or at a separate payoff station within the casino.

A limited access female receptacle 46 which may receive a male plug of a hand-held unit (not shown) carried by the supervisor or other like personnel, may be plugged into female receptacle 46 in the event that an error has occurred. For example, assuming that a player has won a hand and the Loss button 46 or Push button 42 is accidentally depressed, a supervisor may then be called over to rectify the situation by plugging in the male plug of the portable unit carried by the supervisor to permit resetting of the side bet unit 20 to indicate the proper number of wins and the number of selected wins as well as the payoff number. The payoff amount and number of selected consecutive wins cannot be changed, however.

The controller, as shown in FIG. 1a, which may include a microprocessor MPU, random access memory RAM, read-only memory ROM, push button unit PB and display driver DSPLYDR for driving the Display, is provided with a port P for receiving a male plug of a portable remote unit PMPU for transferring data collected in memory, such as RAM, of all transactions per 8-hour shift, per dealer's shift, etc. to evaluate profitability, efficiency, etc. As an alternative or in addition to, port P, a switch LSW which is normally locked and requires a key held by a supervisory is opened (i.e. turned on) to cause the MPU to display the total number of games, total amount bet, and total amount paid out; for each game, the consecutive wins selected, the amount of bet of each game, the payoff of each win and number of games played before loss; and the serial number of the system. Data may be collected and stored in a common buffer memory, which may be periodically accessed by a main computer, as was described hereinabove in conjunction with FIGS. 1j and 1k. Use of the weighing system described above makes it possible to obtain highly accurate data of the bets made for subsequent analysis.

Once all of the numbers have been captured, the registers will be set to zero. The date and time will be maintained in the hand-held device PMPU and will be appended to the record downloaded from a unit 20. These records, now stored, in the hand-held device, may be downloaded to a separate computer system for analysis and reporting.

The unit shown in FIG. 1a is further provided with an input unit INP having a slot SL for receiving a player's card (not shown) provided, for example, with a magnetic strip containing data identifying the card holder as well as other information. An input unit INP is provided at each player's location. Lack of a card at any location is interpreted as being occupied by a player who has not applied for benefits of casino rated play. On the other hand, a player desiring such benefits is issued a card to identify his (or her) play and inserts the card with a view toward obtaining such benefits or "perks". The card may alternatively be a mechanical key, an optical card or a "smart" card for uniquely identifying its holder. An input INP may be provided at each player's position at each of the gaming tables, such as those shown in FIGS. 7 and 9, as well as slot machines, shown in FIGS. 8 and 10.

FIG. 1b shows an electrical connector 46 and a key switch 47 selectively moveable to the positions shown in FIG. 1c. Either or both of these could be used. In the case of the key switch, the relevant numbers could be displayed on the displays on the system and controlled by the + and – buttons. The numbers are observed and manually recorded, as set forth above. The key switch is also used for resetting the system if an error in play occurred such as an inadvertent push of the Loss button. The pit boss would only have to carry a key rather than a more bulky hand-held electronic device. The switch LSW (FIG. 1a) is closed when the key is moved to the data read-out position shown in FIG. 1c.

FIGS. 2a–2d show the chip receptacle and the operating mechanism therefor in greater detail.

Chip receptacle 22 is comprised of a motor 47 having a worm 48 mounted upon its output shaft 7a. The shaft of motor 47 extends in the opposite direction and through an opening in one wall of an enclosure 49 housing motor 47 as well as the other components of side bet unit 20, the shaft portion 47b being provided to receive a hand crank (not shown for purposes of simplicity) to manually operate the chip receptacle in the event of a power failure or the like.

Worm 48 meshes with a worm gear 50 adapted to rotate about the vertical axis of shaft 51 which is freewheelingly mounted within appropriate openings of a pair of arms of a substantially C-shaped support 52 by means of bearings 53 and 54. Worm gear 50 is secured to shaft 51 by a set screw 50b provided in integral collar 50a of worm gear 50.

A cam 55 is also mounted upon shaft 51 and is secured thereto by a set screw 55b provided in integral collar 55a of cam 55. A push rod 56 is slidably mounted within a bore 58a provided within a supporting block 58.

A cam follower 57 has a tapered portion thereof slidably engaging the periphery of cam 55. Cam follower 57 extends into a bore 56a within push rod 56. A spring 59 arranged within bore 56a pushes against the right-hand end of cam follower 57 which provides a resilient mount therefore.

The right-hand end of push rod 56 (see FIG. 2d) bears against a "knee" formed between a pair of H-shaped levers 60, 61 which are joined at the aforesaid "knee" by a pin 62, as shown. The right-hand end of H-shaped member 61 is swingably mounted to a bearing block 63 for movably supporting the chip elevator shaft 64 which extends through bores 63a and 63b provided in bearing block 63. The swingable mount between lever 61 and bearing block 63 comprises a pair of pivot pins 65a, 65b arranged on opposite sides of bearing block 63 (pin 65b being obscured from view in FIG. 2d).

Upper H-shaped lever 60 is secured to the elevator shaft 64 by pivot pin 66.

A platform 64a, which is integrally joined to the upper end of shaft 64, presses against the elevator platform 67 selectively raising and lowering same.

The lower end of bearing block 63 has a projection 63c which extends in an opening within a floor 49b of enclosure 49.

Figure 2B:
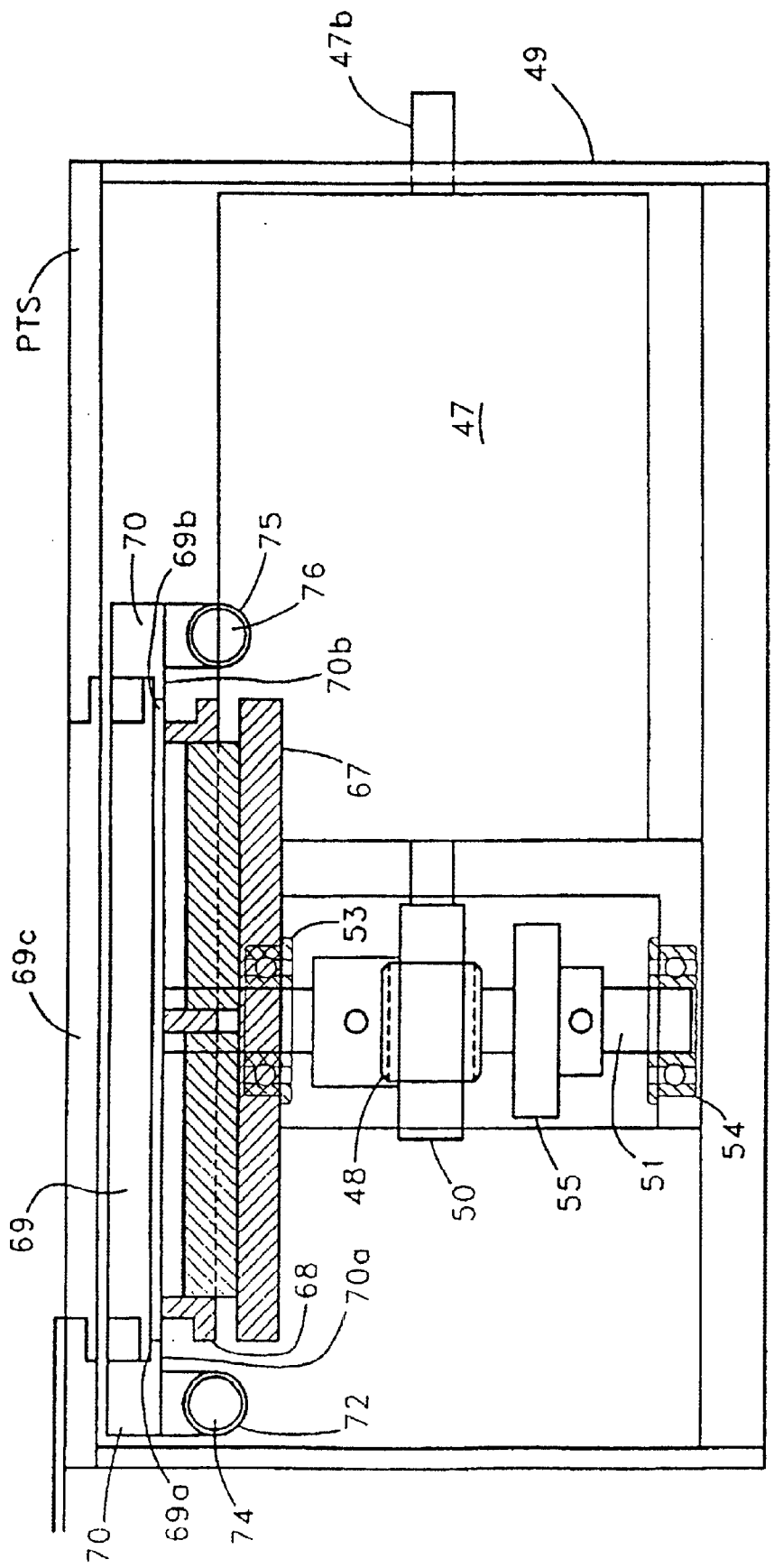
FIG. 2b shows a view of the portion of the mechanism shown in FIG. 2a looking in the direction of arrows 2b—2b.
Figure 2D:
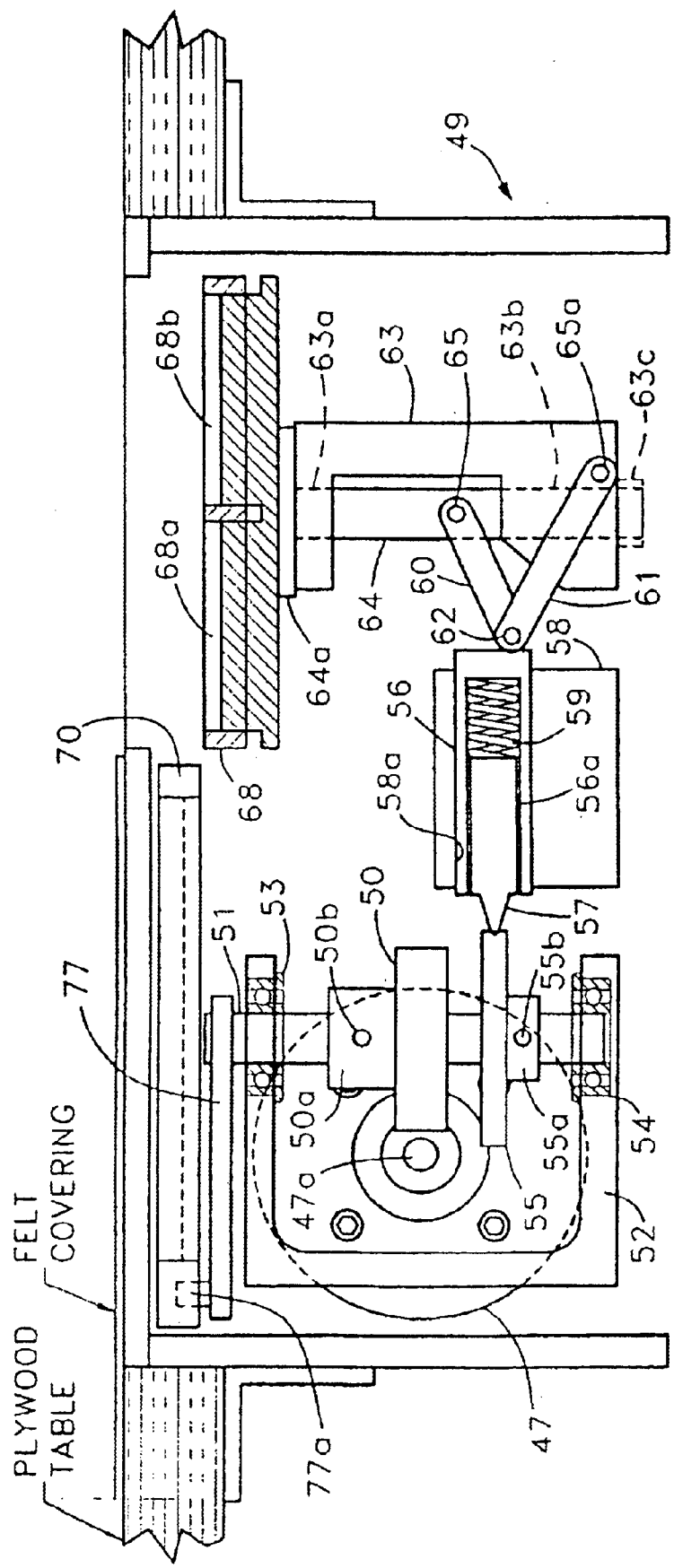
FIG. 2d shows a portion of the player's side bet unit of FIG. 2a looking in the direction of arrows 2d—2d.

Elevator platform 67 is shown in greater detail in FIG. 4 and is comprised of a substantially planar support sheet 67a having integrally joined thereto, such as, for example, by an epoxy or suitable adhesive or glue, a plurality of disc-shaped projections 67b through 67e adapted to selectively extend through openings 68a–68d, respectively provided within a chip holder member 68. A glass or transparent plastic plate 69 is slidably moveable over chip holder 68 and is arranged to be carried by a supporting frame 70 guided by a pair of guide rods 74 and 75 arranged in spaced parallel fashion as shown in FIGS. 2a and 2b. Frame 70 has an inwardly directed flange 70a as shown in FIGS. 2a and 2b. Notches 69a and 69b provided in transparent member 69 rest on flanges 70a, 70b as shown in FIG. 2b. Frame 70 is provided with a pair of hollow cylindrical sleeves 72, 73 which slidably receive elongated guide rod 74. A third hollow sleeve 75 slidably receives a shorter guide rod 76 (see FIG. 2a).

A drive arm 77 (FIGS. 2a and 2d) has one end thereof fixedly secured to the upper end of shaft 51. A drive pin 77a is secured to the opposite end of drive arm 77 and rides within an elongated groove 78 in carrier 70 groove which has a straight portion 78a joined with two contiguous curved portions 78b, 78c. The operation of the chip receptacle mechanism is as follows:

A weighing sensor S of the type described hereinabove is arranged beneath the projections 67b through 67e. The top surfaces 67b-1 through 67e-1 are free to move, enabling the sensors to determine the weight of a chip placed upon the surface. Since each sensor weighs only one chip, the accuracy is significantly increased.

Initially, the window 69 is opened, as shown in FIG. 5a. One or more chips are placed in the chip receptacle and more specifically within openings 68a through 68d. FIG. 5a shows a chip C being lowered into the chip receptacle. FIG. 5b shows two chips positioned within the chip receptacle. When the elevator platform 67 is in the position shown in FIGS. 5a and 5b the "READY TO PLAY" display 36 is illuminated.

The amount of the bet is presented in display 28 shown in FIG. 1.

The "+" and "−" buttons 38 and 40 are selectively operated to select the number of consecutive wins desired by the player.

A game is begun by pushing the dealer's game begin button 14 causing the buttons 38 and 40 to be isolated and disabled from operation until the number of consecutive wins selected is reached or in the event of an intervening losing game.

Operation of the dealer's game begin button energizes motor 47. With the chip receptacle in the open position, motor 47 rotates counterclockwise causing drive pin 77a, driven through shaft 47a, worm gear 48 and worm gear 50 and shaft 51, to rotate counterclockwise, as shown by arrow A in FIG. 2a. The counterclockwise rotation begins at about "one o'clock" in FIG. 2a which initially causes drive pin 77a to move along curved recess portion 78c. During this time the carrier 70 does not move. However, the cam 55 is rotated causing the chip elevator to be lowered to receive chips and to provide clearance for the carrier 70 and window 69. Further, rotation causes drive pin 77a to move in the leftward direction along the linear portion 78a of guide groove 78 causing the carrier frame 70 and hence the transparent window 69 to move in the direction shown by arrow B.

Figure 3A:
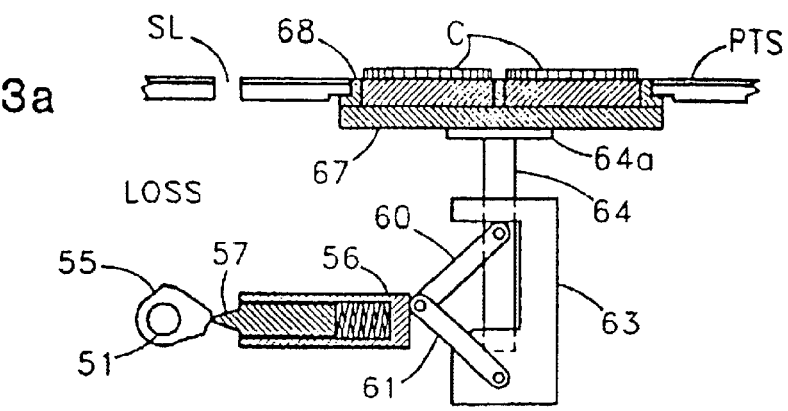
FIGS. 3a–3d show various stages of the chip "elevator" mechanism incorporated into the player's side bet unit of FIGS. 2a–2d.
Figure 3B:
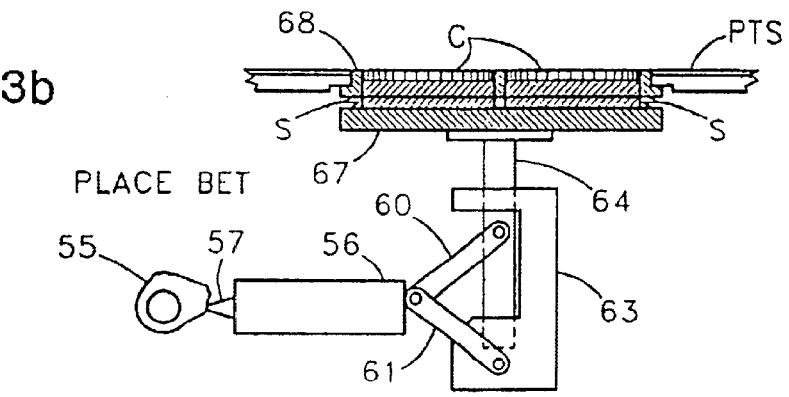

FIG. 3b shows the position of cam 55 at the moment in which chips are being received. It should be noted that the nose of cam follower 57 is positioned to engage a notch in the surface of cam 55 whereby push rod 56 moves to the left sufficiently to enable the knee of levers 60 and 61 to move to the left, thereby lowering the end of lever 60 and hence lowering the elevator shaft 64. The springs S between the engaging surfaces of chip elevator 67 and chip holder 68 assure the downward movement of chip elevator 67, dropping the chips C below the Playing Table Surface PTS.

Figure 3C:
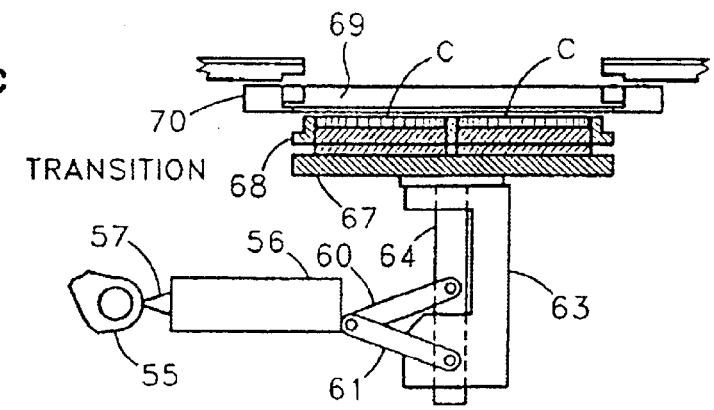

As the motor continues its rotation, cam 55 moves to the position shown in FIG. 3c whereby the nose of the cam follower 57 and push rod 56 move further to the left relative to FIG. 3b, causing elevator shaft 64 to move downwardly to the lower-most position shown in FIG. 3c whereby the chip elevator platform and chip holder 68, as well as the chips C, move downwardly. This position is also shown in FIG. 5c.

As was pointed out hereinabove, the drive pin 77a which is moving the transparent member frame 70, moves frames 70 so that it is immediately above the chip holder 68 and chip elevator 67. This position is shown in FIG. 5d as well as FIG. 3c.

As carrier frame 70 moves in the direction shown by arrow B, pin 77a moves towards the left-hand end of the linear section 78a of groove 78 and when the arm 77 reaches a "nine o'clock" position, pin 77a moves from the right to the left. When drive pin 77a is in the "six o'clock" position (relative to FIG. 2a), drive pin 77a, which continues to move counterclockwise, enters into the curved recess portion 78b and moves out of this recess. The carrier 70 is not moved during the time that drive pin 77a is in curved recess 78c.

Figure 3D:
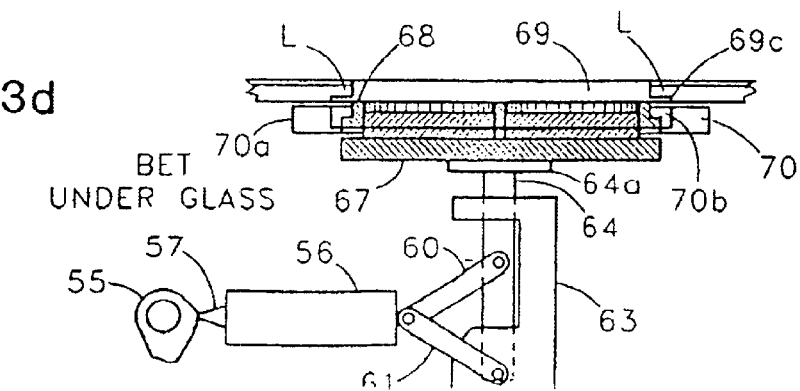

Substantially simultaneously therewith, i.e. during the time that the drive pin 77a is in the curved section 78b, the nose of cam follower 57 engages the portion of the cam 55 as shown in FIG. 3d which causes push rod 56 to be moved toward the right which causes elevator shaft 64, platform 64a, chip elevator 67 and chip holder 68 to be lifted upwardly to the position shown in FIG. 3d, lifting the glass cover plate 69 upwardly from its position resting upon the support flanges 70a, 70b and so that its upper notched region 69c engages the cooperating notches N in the Playing Table Surface PTS so that the central portion 69c of cover 69 projects through Glass Opening GO which receives the central portion 69c, thereby locking the glass cover into position preventing the glass cover from movement in a horizontal direction due to the fact that the marginal portions of the glass openings engages all four sides of the central portion 69c and further preventing any movement in the vertical direction due to the fact that elevator shaft 64 and supporting platform 64a maintains the chip elevator 67, chip holder 68 and glass member 69 in the covering position with cover 69 pressed against lip L of the portion of the table surrounding cover 69.

FIG. 5d shows the position occupied by the glass cover 69 preparatory to being locked into position. FIG. 5e shows the elevated position in which the top surface of the glass cover plate is flush with the Playing Table Surface PTS. In this position, although the chips cannot be disturbed, the chips can be viewed throughout the entire time required to play the number of consecutive wins selected by the player.

In the event that a player who has selected a given, consecutive win experiences a losing hand, the dealer presses the Loss button 44 of that player's unit 20, causing the motor 47 to be energized and to be rotated in a reverse direction which cause drive rod 77 and drive pin 77a to move in the clockwise direction. Drive pin 77a enters into curved portion 78c of recess 78 and eventually moves into the linear portion 78a thereof. When the drive pin 77a is in curved section 78c, the carrier does not move. However, the cam 55 is rotating at this time. As the drive arm 77 moves in the clockwise direction from the "six o'clock" position to the "nine o'clock position" relative to FIG. 2a, drive pin 77a moves towards the left-hand end of groove 78. Prior to movement of the carrier frame 70, i.e. when drive pin 77a is in the curved recess 78c (from about the "five o'clock" position to the "six o'clock" position) cam 55 moves from the position shown in FIG. 3d through the position shown in FIG. 3c, dropping the chip elevator 67 and chip holder 68 downwardly, causing the glass panel 69 to be lowered from the locked position shown, for example, in FIG. 3d so that the glass plate 69 is now resting upon the support flange of carrier frame 70.

As drive pin 77a moves from the "six o'clock" position toward the "twelve o'clock" position of FIG. 2a, the carrier 70 and glass plate 69 are moved from the position immediately above the chip receptacle to the position fully displaced from the chip receptacle as shown in FIG. 2a, frame 70 occupying the solid line position shown therein.

The drive pin thereafter moves from the "twelve o'clock" position to approximately the "one o'clock" position moving along curved groove 78c, which movement is required to move cam 55 to the position shown in FIG. 3a causing the push rod 56 to be moved to the right, lifting chip elevator 67 and chip holder 68 to the position shown in FIG. 3a so that chips C are elevated above the Playing Table Surface PTS and can be easily swept away by the dealer.

FIG. 5f shows members 67, 68 and 69 being lowered, FIG. 5g shows the glass cover 69 moved to the right after members 67 and 68 have been lowered to provide clearance for movement of glass plate 69, while FIG. 5h shows the members 67 and 68 in the raised positioned in which chips C are arranged above the Playing Table Surface PTS to be easily and readily removed by the operator.

FIG. 6a shows further details of the chip detection and chip denomination sensors, one being provided for each chip position. A single chip is shown in FIG. 6a resting upon the weighing platform. Detection of the presence and denomination of a chip is obtained through the use of the load cell (i.e., a force sensor).

The weight of the chip is presented in analog form at the output of load cell L and is converted to digital form by an A/D converter. A Look-up Table, stored in a memory compares the digital value for chip weight with chip weights stored in memory to determine the monetary amount assigned to the chip. Alternatively, the Look-up Table may be replaced by a computer employing a suitable algorithm for calculating the monetary value. The monetary value, in digital format, is transferred to a central computer through a communications link for analysis. In the side bet receptacle, the weighing technique is performed at each of the four (4) weighing stations (see FIG. 4) having weighting platform 67b-1 to 67e-1 which are freely moveable to enable the weight sensors to determine chip weight (see FIGS. 5a–5h) and the analog outputs are sequentially transferred to the A/D converter, look-up table and communications link.

Data on both unidentified players and card/key holders is collected, which data includes the average bets for card/key holders and unidentified players, total amount bet at a table by a player (i.e., the "handle"), and each player's win/loss data, for example. The system enables betting data to be accurately determined and stored for subsequent transfer to a main computer, for example (see FIG. 1j), for all types of analysis as was described hereinabove.

The microprocessor or computer controls the sequence of closing of switches, such as switch SWD, for selectively coupling power across each of the weighing sensors, in sequential fashion, as shown in FIG. 1g.

By measuring the amplitudes of the signals from the A/D converters and processing these signals in the software, an accurate monetary determination of the chip can be made. False readings due to ambient conditions are eliminated by disabling the value detection system until the chip detection system has determined that the chip is properly placed in a chip recess and the receptacle is covered.

The push key 42 shown in FIG. 1 is optional and may be provided in those applications wherein a tie occurs, i.e. when a player and a dealer have hands totaling the same amount, which amount is no greater than twenty-one (21)).

In applications where a "Push" is considered to be a win, the push key 42 may be eliminated or ignored.

As an alternative to the chip receptacle, chips may be placed in a chip slot and fall by gravity into a protected container arranged beneath the table. As each chip is placed in the slot, it is weighed to determine its denomination.

Alternatively, chips raised to the surface of the table by the chip receptacle may be swept into a hopper or container (not shown) arranged beneath the table and communicating with the Playing Table Surface PTS by a slot SL' (see FIG. 7). The chips are swept from the chip receptacle and into the slot SL' provided and fall into the hopper when a player loses his side bet or when a payoff is to occur at a remote location.

Although the embodiment described hereinabove incorporates the consecutive wins side bet units and/or progressive betting into a blackjack game, it should be understood that the side bet and/or progressive bet systems and the units thereof may be employed in all other games of chance played at tables such as roulette, craps, poker, mini-baccarat, etc. The consecutive win side bet system may be very easily integrated into poker games played at a table regardless of whether the game is five card stud or low hand poker (i.e., "Streak"-as well as other poker games) as will be described hereinbelow in greater detail. The consecutive wins payoff and bet options listed below represent the payoff for all table games, slot machines or video games.

A progressive bet is made by placing a chip, (typically a $1.00 chip) in a receptacle on the table surface adjacent each player and identified as "PROGRESSIVE BET", as shown in FIG. 11, for example. FIG. 11 shows a blackjack layout with a progressive bet area, a conventional betting area, a consecutive win bet area, and a card receiving slot as well as a data input unit including a panel, for each player The receptacle 100, also shown in FIGS. 1h and 1i, comprises a recess having an opening 100a. A sensor 102 beneath opening 100a senses the presence or absence of a chip. The recess has an extended finger receiving portion 100b to facilitate removal of the chip C. The receptacle (recess) prevents the chip from being accidentally moved during play and further serves to assure that the chip is in proper registry to assure proper identification of the chip.

All of the tables within a casino, city or state or other region participating in the progressive system participate through a communications link between all participating tables and a central location monitoring play and controlling growth of the jackpot and winnings. The progressive pot continues to build until a player wins, at which time, after paying the winner, a new progressive jackpot is initiated.

When integrated into a craps game consecutive wins may be limited to the number of consecutive times a player wins or loses. Other bets such as the number of consecutive times a player throws a particular number can be employed as another possible side bet. A progressive bet may be based upon a number of consecutive wins.

When integrated into a roulette game, consecutive wins and/or a progressive bet may be limited to the number of consecutive times the player correctly selects an odd bet or an even bet, a black bet, a red bet, a 1–18 bet or a 19–36 bet (even money bets). Other non even money bets such as single number bets, two number bets, three number bets, four number bets, six number bets, twelve number bets, and column bets can be employed as another possible side bet. A progressive bet may be based on a given number of consecutive wins. U.S. Pat. No. 5,718,431 describes additional bet switches to be used to indicate to the system whether an odd, even, red or black bet is selected by the player as shown in FIG. 3 thereof which depicts a roulette layout. The touch screen is replaced in the bet unit 20 shown in FIG. 1 of the present application.

The side bet and/or progressive bet system may be utilized in a slot machine or a video game wherein the unit may either be integrated into the machine housing or positioned immediately adjacent thereto and the electrically connected with the game operating circuitry. The input unit INP may also be employed in the slot machine to compile data of a card/key holder.

For example, in a video blackjack slot machine which simulates a dealer and player playing head to head, an "identified player places his car/key into a suitable slot in the machine. Thereafter, one or more chips may be arranged within the chip receptacle or coins or tokens may be deposited directly into the machine either in the same receptacle receiving a coin or token for initiating play of a game or in a separate coin or token slot and then a number of consecutive wins is selected by the operator. Coins deposited without insertion of a card/key designates the player as "unidentified". As each play is completed, a signal indicating a winning play increments the consecutive wins display 30 (see FIG. 1). When the number of consecutive wins in display 30 equals the number of consecutive wins selected and presented by display 32, all of the lights on the display panel flash, preferably accompanied by an audible alarm to indicate a payoff. The payoff may be derived either from the video slot machine or a central payoff window. Suitable video games with which the bet unit 20 may be interfaced may, for example, be Live Video Poker, Live Video Roulette and Live Video Craps produced by ICGA and Aces and Faces produced by IGT. However, any other video game may be utilized, if desired.

FIG. 7 shows a low hand poker (i.e., "Streak") table game in which the side bet system of the present invention is integrated. The low hand poker challenge operates as follows:

Player Procedures:

Player selects one of the consecutive bet options listed under Payoff Rules as previously described under blackjack. All other procedures before the game begins are the same as blackjack. Whether the game is a table game, a video game, or a slot machine, the casino determines the number of bet options which may be selected and the requirements of a progressive bet.

Dealer gives each player and himself one card at a time, dealing left to right until all five cards are dealt. The cards are dealt face down. The Dealer exposes his cards one at a time after the Players have seen their cards. The lowest hand of the dealer or player wins as described hereinbelow.

A bet unit 20 (see FIG. 1) is provided adjacent to each player as in blackjack; however, there will not be a conventional bet as in blackjack—only the consecutive wins bet.

| Payoff Rules: | |
| --- | --- |
| 2 consecutive wins pays | 4 for 1 |
| 3 consecutive wins pays | 7 for 1 |
| 4 consecutive wins pays | 15 for 1 |
| 5 consecutive wins pays | 30 for 1 |
| 6 consecutive wins pays | 60 for 1 |
| 7 consecutive wins pays | 120 for 1 |
| 8 consecutive wins pays | 240 for 1 |
| 9 consecutive wins pays | 480 for 1 |
| 10 consecutive wins pays | 960 for 1 |
| 11 consecutive wins pays | 1920 for 1 |
| 12 consecutive wins pays | 3840 for 1 |
| 13 consecutive wins pays | 7680 for 1 |
| 14 consecutive wins pays | 15,360 for 1 |

(The progressive bet may be 20 consecutive wins, for example.)

Rules:

The lowest possible hand is a 7, 5, 4, 3, 2 of mixed suits; and

Poker hands in order of lowest to highest: no pair, one pair, two pair, three of a kind, straight flush, full house, four of a kind, and straight.

No Pair: The smallest denomination card wins. If player-dealer have the same highest card, or, same two highest cards, or same three highest cards, or same four highest cards, the next card determines the winner. If all five cards are the same, there is no winner and the game is delayed.

One Pair: If player-dealer have One Pair (two cards of the same numerical value), the lowest value pair wins. If both player-dealer have a pair of the same value, the lowest third, fourth (if necessary), or fifth (if necessary) lowest card determines the winner.

Two Pair: If player-dealer hands consist of Two Pairs, the lower of the two pairs wins. If player-dealer lowest pair is the same, the second lowest pair determines the winner. If player-dealer have the same two pairs, the lowest odd card determines the winner.

Three of a Kind: If player-dealer have Three of a Kind, the lowest numerical value three cards of the same denomination wins.

Straight: the lowest of five cards that run in numerical order with a mixture of suits wins, if player-dealer both have a Straight.

Flush: if all five cards are the same suit, the player or dealer has a Flush. If both have flushes, the smallest denomination cards win as in No Pair.

Full House: a combination of Three of a Kind a A Pair is a Full House. The lowest numerical value Three of a Kind wins, if both player and dealer have Full House.

Four of a Kind: the lowest numerical value four cards of the same denomination wins, if both player and dealer have Four of a Kind.

Straight Flush: the lowest value cards that run in numerical order and are the same suit wins, if both player and dealer have a Straight Flush.

Figure 8:
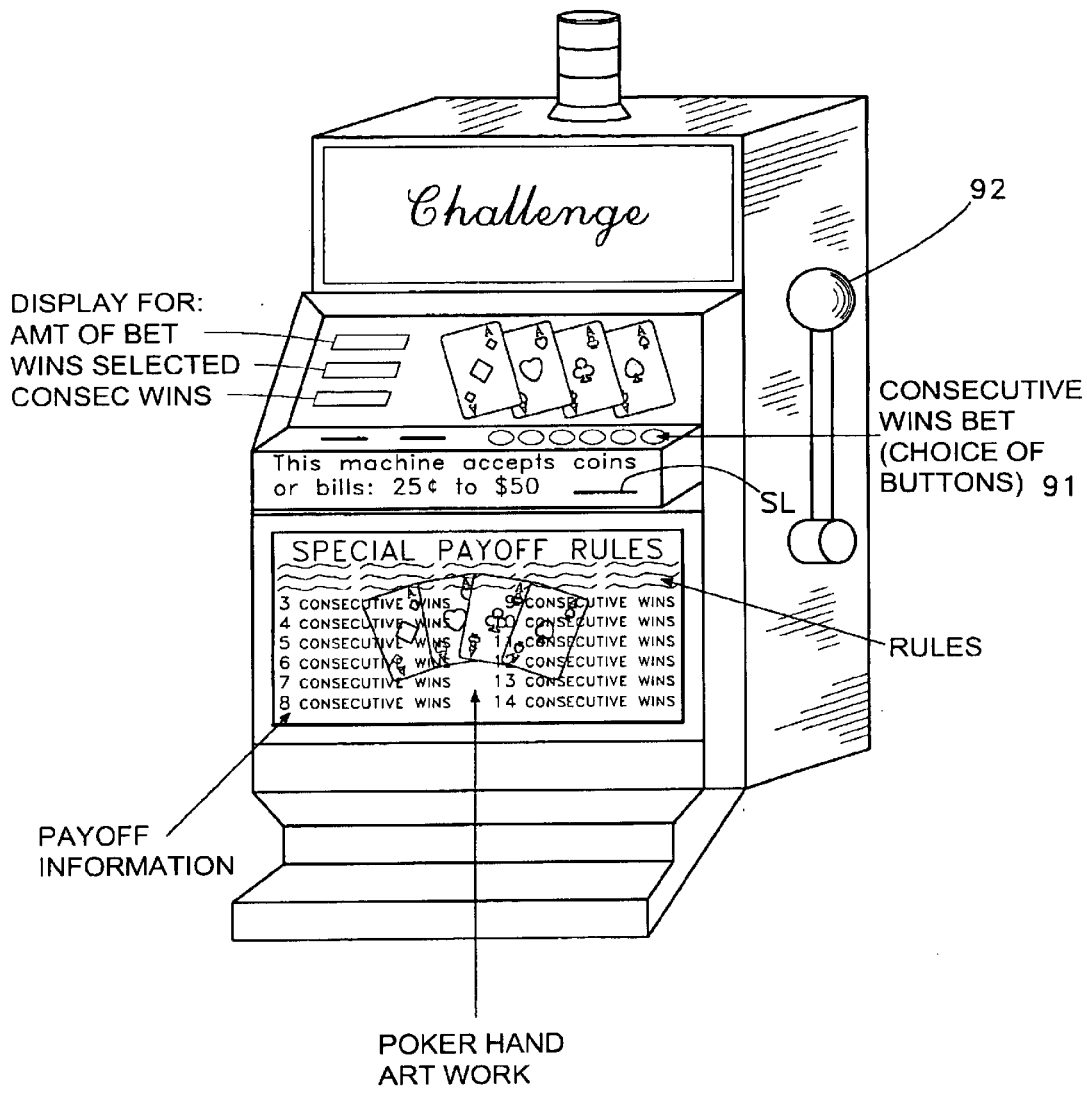

FIG. 8 shows a low-hand poker slot (i.e., "Streak") game in which a side bet and/or progressive be may be utilized. The operation of the game and machine is as follows:

Player Procedures:

Insert bills, coins or tokens into slot 92 of machine 90, representing amount of bet.

Select one of the consecutive bet options (listed under payoff) by operating button (or buttons) 91.

Selection cannot be changed once made as was described hereinabove.

After handle 92 is pulled, or a button pushed, if casino so desires, dealer's five cards and player's five cards are shown on machine screen, one at a time. Player's first card appears, followed by the dealer's first card, which is followed by player's second card, etc.

The rules as described hereinabove for low hand poker apply here.

Displays:

LCD Screen located on front of machine will show payoff (28):

Dollar amount of bet once placed (28);

Consecutive win selection (32); and

Number of consecutive wins (30), consecutive win number reverts to zero if player loses.

Figure 9:
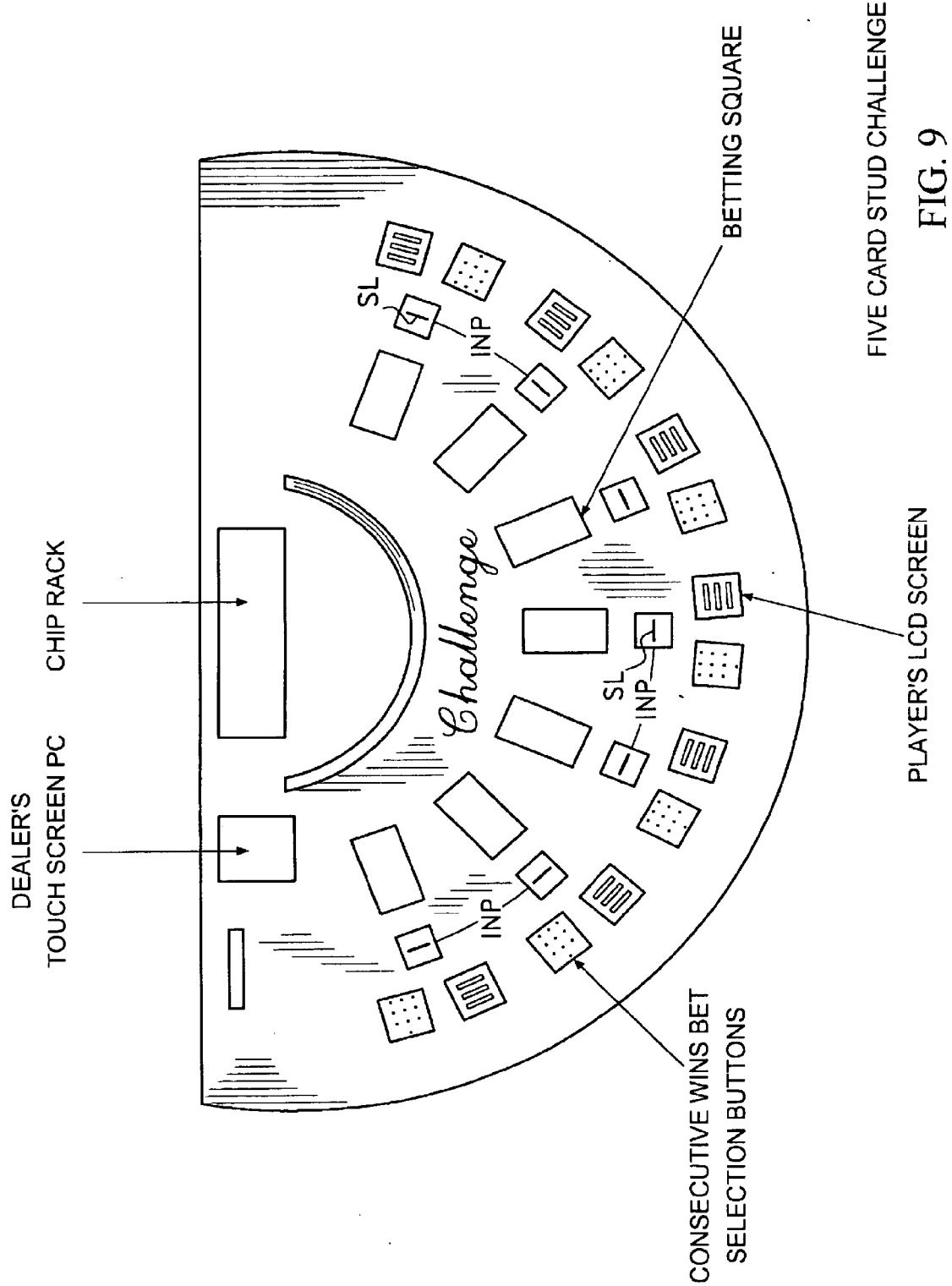

FIG. 9 shows the manner in which the side bet and/or progressive bet system and units of the present invention are integrated into a five card stud STREAK game (STREAK is a trademark of MAO Gaming, Inc. identifying a game having a consecutive wins bet). Player Procedures:

Chips ($1, $5, $25, $100) placed into the chip receptacle 20 (see FIG. 1) by player up to a maximum to be determined by casino.

Player selects one of the consecutive bet options listed under Payoff Rules by pressing relevant buttons 38 or 40 (see FIG. 1).

Once placed, bets cannot be changed.

Dealer Procedures:

Dealer operates start game button 14 (see FIG. 1). Each players' consecutive wins display 30 is incremented under player loses whereupon Loss button 44 is pressed.

Dealer will give each player and himself one card at a time, dealing left to right until all five cards are dealt. The cards are dealt face down. The dealer will expose his cards one at time after the players have seen their cards.

Displays:

LCD Screens show:

dollar amount of bet once placed (28);

consecutive number of wins (30); and selected number of consecutive wins (32).

When player loses, light in consecutive bet selection button and LCD screen turns off and chips are uncovered and removed.

| Payoff Rules (as one Example-others may be used): | |
| --- | --- |
| 2 consecutive wins pays | 4 for 1 |
| 3 consecutive wins pays | 7 for 1 |
| 4 consecutive wins pays | 15 for 1 |
| 5 consecutive wins pays | 30 for 1 |
| 6 consecutive wins pays | 60 for 1 |
| 7 consecutive wins pays | 120 for 1 |
| 8 consecutive wins pays | 240 for 1 |
| 9 consecutive wins pays | 480 for 1 |
| 10 consecutive wins pays | 960 for 1 |
| 11 consecutive wins pays | 1920 for 1 |
| 12 consecutive wins pays | 2840 for 1 |

-continued

| Payoff Rules (as one Example-others may be used): | |
|---|---|
| 13 consecutive wins pays | 7680 for 1 |
| 14 consecutive wins pays | 15,360 for 1 |

(The progressive bet may be for 20 consecutive wins.)

Rules:

The highest possible hand is the combination of Ace, King, Queen, Jack, and Ten of the same suit.

Poker hands in order of highest to lowest: Straight Flush, Four of a Kind, Full House, Flush, Straight, Three of a Kind, Two Pair, One Pair and No Pair.

Straight Flush: the highest value five cards that run in numerical order and are of the same suit wins, if both player and dealer have a Straight Flush.

Four of a Kind: the highest numerical value four cards of the same denomination wins, if both player and dealer have Four of a Kind.

Full House: a combination of Three of a Kind, and A Pair is a Full House. The highest numerical value Three of a Kind wins, if both Player and Dealer have a Full House.

Flush: If all five cards are of the same suit, the Player or Dealer has a Flush. If both Flushes, the highest denomination cards win as described below under No Pair.

Straight: the highest five cards that run in numerical order with a mixture of suits wins, if player and dealer both have a Straight.

Three of a Kind: if player and dealer both have Three of a Kind, the highest numerical value three cards of the same denomination wins.

Two Pair: if player and dealer hands consist of Two Pairs (cards of the same numerical value), the highest value pair wins. If both player and dealer highest pair is the same, the second highest pair determines the winner. If player and dealer have the same two pairs, the highest fifth card determines the winner.

One Pair: If both player and dealer have One Pair, the highest pair wins. If both player and dealer have a pair of the same value, the highest third, fourth (if necessary) or fifth (if necessary) highest card determined the winner.

No Pair: the highest denomination card wins. If player and dealer have the same highest card, or same two highest cards, or same three highest cards, or same four highest cards, the next highest card determines the winner. If all five cards are the same, there is no winner and the game is replayed.

Figure 10:
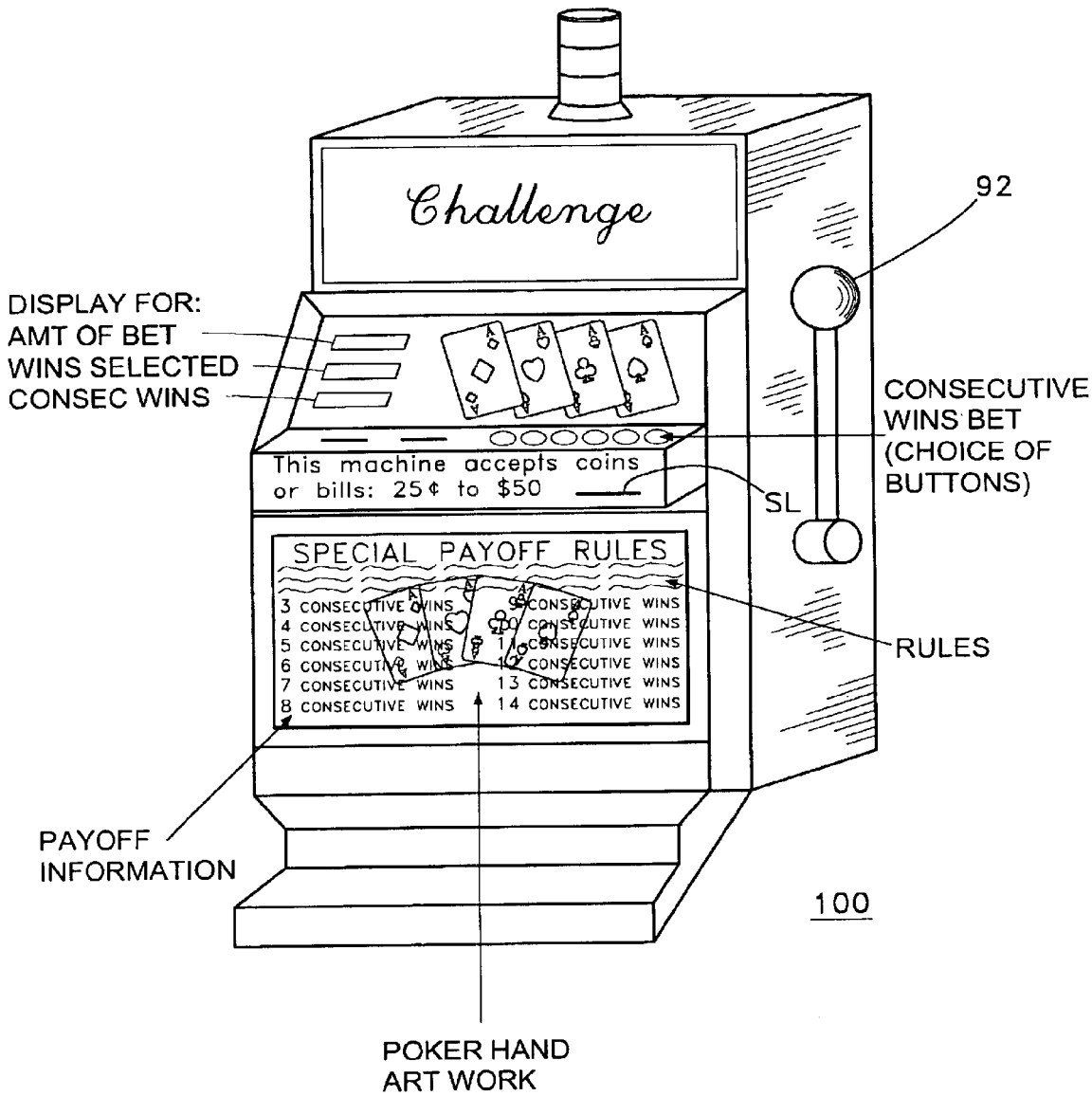

FIG. 10 shows a five card stud slot challenge game. The operation of the game and machine is as follows:

Player Procedures:

Insert bills, coins or tokens representing amount of bet.

Select one of the consecutive bet options (listed under payoff) by operating the buttons 38, 40 (see FIG. 1). Selection cannot be changed once made.

After handle 101 is pulled (or button pressed), dealer's five cards and player's five cards will show on machine screen 102, one at a time. Player's first card is followed by dealer's first card, etc.

The rules described hereinabove in the five card stud table game apply here.

The payoff rules are the same as previously described for the various poker games and all other table games and video games.

Special Displays:

Payoff (26);

Amount of bet (28);

consecutive win selection (30); and number of consecutive wins (38).

Consecutive win number reverts to zero if player loses. Player selects amount of bet, bet option and insert bills/coins in order to begin new bet cycle.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A betting system for use in the play of a game employing a game playing surface having a plurality of player locations, said system comprising:
    an area provided at each player location for receiving betting chips;
    said area having weighing means for determining a total weight of chips placed thereon;
    said betting chips employed in said system comprising a predetermined number of different denominations, each denomination having a weight which is different from every other denomination and being selected so that no combination of betting chips have a total weight range which equals the weight of any one betting chip whereby a weight determined by said weighing means accurately indicates a total monetary value of the chips on said weighing means.

2. The betting system of claim 1, wherein the range of weights of the betting chips are further selected so that a first group of chips whose denominations total a given monetary value has a total weight which is less than a total weight of a second group of betting chips whose total monetary value is equal to said given monetary value and wherein said second group comprises a greater number of betting chips than said first group.

3. The betting system of claim 1 wherein the monetary values of the betting chips in the system are one monetary unit, five monetary units, twenty-five monetary units and one-hundred monetary units.

4. The betting system of claim 3 wherein said chips on one, five, twenty-five and one-hundred monetary units have mid-range weights on x units, x+1 units, x+6.4 units; and x+26.3 units respectively, wherein x is a compound fracture, assigned weights of said chips enabling the weighing means to accurately determine a monetary value of betting chips of different weight on said weighing means.

5. The betting system of claim 4 wherein x is a compound fraction.

6. The betting system of claim 4 wherein a total number of betting chips received by said weighing means lies in a range of one (1) to twenty-five (25) chips.

7. The betting system of claim 6 wherein the monetary values of the betting chips lie in a range of from one(1) to one-hundred (100) monetary units.

8. The betting system of claim 7 wherein the monetary units are dollars.

9. The betting system of claim 1 further including a second area for receiving a side bet, which is at least one of a side bet and a progressive bet, and a receptacle for receiving a conventional bet comprised of chips stacked in a plurality of groups;
    a group of weighing means for each chip position for converting a chip weight into a monetary value; and
    means for summing the monetary values to obtain a total monetary value of the conventional bet and at least one of the side bet and progressive bet.

10. The system of claim 9 wherein said second group of weighing means further comprises means for sequentially converting the chip weight at each chip position into a monetary value.

11. The betting system of claim 1 wherein said weighing means comprises a first means for converting a total weight of chips deposited thereon into an analog signal;
an A/D converter for converting the analog signal into a digital signal; and means for converting the digital signal into a monetary value.

12. The betting system of claim 11 wherein said converting means comprise table look-up means.

13. The betting system of claim 12 wherein said table look-up means comprises a memory storing monetary values associated with each combination of chips.

14. The system of claim 11 wherein said first means comprises a load cell.

15. The betting system of claim 1 wherein:
there are at least four (4) denominations of betting chips, each lower denomination chip having a value which divides evenly into all higher denominations and wherein a number of chips of each denomination needed to equal the denomination of a single one of the chips of the higher denominations, except for that denomination which is greater than all of the other denominations, is greater in weight than a chip of each higher denomination.

16. The apparatus of claim 15 wherein each weight is given in grams.

17. The apparatus of claim 16 wherein each possible combination of chips is at least 0.10 grams different from any other possible combination to facilitate accurate weighing operations by the weighing means.

18. The betting system of claim 1 wherein a weight of each betting chip is a compound fraction.

19. A method of incorporating one of a conventional bet, consecutive win side bet and a progressive bet into a game of chance utilizing betting chips of different denominations, each chip of a denomination being of a different weight from every other chip denomination, said method comprising the steps of:
a) at least one player wagering at least one chip to participate in the game of chance;
b) said at least one player further wagering one chip on a consecutive wins or losses bet;
c) determining the weight of the step (b) wager;
d) converting the weight at step (c) to a monetary value which correctly indicates a total monetary value even when the chips being weighed are of different denominations and hence different weights;
e) presenting a display of a payoff amount according to pre-programmed payoff odds which correspond to different values of the prospective consecutive wins or losses of step (b); and
f) providing a winning indication when number of consecutive wins or losses originally selected in step (b) is equaled.

20. The method of claim 19 further comprising terminating the playoff display and removing the wagers made in steps (a) and (b) in the event that the player making such wager loses a game prior to achieving the selected number of consecutive wins.

21. The method of claim 19 further comprising:
g) covering the consecutive wins bet made during step (b) within a receptacle during a consecutive win play period.

22. The method of claim 21 further comprising:
h) uncovering the bet covered during step (g) when either a player has achieved a number of consecutive wins equal to a selected number or when a player loses a game prior to achieving the selected number of consecutive wins.

23. The method of claim 22 further comprising flashing said display generated during step (e) when a player having made the bet of step (a) has won a number of consecutive games equal to the selected wins number.

24. The method of claim 23 wherein the step of flashing said display further includes making an audible alarm contemporaneously with flashing of said display.

25. The method of claim 19, further comprising;
(g) determining the weight of the chip wagered in step (a);
(h) converting the weight of the chip determined in step (g) into a monetary value; and
(i) storing the value at step (h) for subsequent analysis.

26. The method of claim 25 wherein at least two chips are wagered at step (b) and further comprising:
(j) performing steps (g) and (h) for each chip in sequential fashion; and
(k) summing the monetary values obtained to determine the total monetary value.

27. The method of claim 19 wherein step (d) further comprises generating an analog signal representing the weight determination and step (e) further comprises converting the analog signal into a digital format signal and determining monetary value using the digital signal.

28. The method of claim 19 wherein at least two chips are wagered at step (a) and further comprising:
(g) determining a total weight of the chips wagered during step (a); and
(h) determining the monetary value of the total weight obtained in step (g).

29. The method of claim 28 further comprising employing a look-up table to convert total weight into total monetary values.

30. The method of claim 28 further comprising:
(i) converting the total weight to into an analog signal and converting the analog signal into a digital signal for use at step (h).

31. The method of claim 19 wherein the game of chance is blackjack and further including the steps of:
g) providing an indication of initiation of a game when at least one player has performed step (a);
h) covering the chip or coin wagered during step (a) responsive to the indication provided at step (d);
i) dealing each player who has performed at least step (a) and the dealer with a given number of cards;
j) paying off winning players and removing all wagers made at step (a) for all losing players;
k) providing a Loss button at a player's location of a player who has performed step (a) and has lost a game;
l) operating a Loss button at a player's position of a player who has performed step (a) and has lost a game; and
m) removing the display of the player whose Loss button was operated at step (l) and, removing the wager mage by said player during step (a).

32. The method of claim 19 wherein the game of chance is blackjack and further including the steps of:
g) providing an indication of initiation of a game when at least one player has performed step (a);
h) covering the chip or coin wagered during step (a) responsive to the indication provided at step (e);

i) dealing each player who has performed at least step (a) and the dealer with a given number of cards;

j) paying off winning players and removing all wagers made at step (a) for all losing players;

k) providing a Push button at each player's position; and l) operating a Push button at a player's position of a player who has performed step (a) and has tied a game to omit the tied game from the consecutive wins accumulation and permit play to continue as though the tied game never occurred.

33. The method of claim 19 wherein the game of chance is poker and further including the steps of:

g) providing an indication of initiation of a game when at least one player has performed steps (a) and (b);

h) covering the chip or coin wagered during step (b) responsive to the indication provided at step (e);

i) dealing each player who has performed at least step (a) and a dealer with a given number of cards;

j) paying off winning players and removing all wagers made at step (a) for all losing players;

k) providing a Loss button at a player's position;

l) operating a Loss button at a player's position of a player who has performed step (b) and has lost a game; and m) removing the display of the player whose Loss button was operated at step (l) and, removing the wager made by said player during step (b).

34. The method of claim 19 wherein the game of chance is craps and further including the steps of:

g) paying off winning players and removing all wagers made at step (a) for all losing players at an end of a game; and h) providing a Loss button at each player's position; and i) operating a Loss button at a player's position of a player who has performed step (a) and has lost a game; and j) removing the display of the player whose Loss button was operated at step (i) and removing the wager made by said player during step (b).

35. The method of claim 19 wherein the game of chance is baccarat and further including the steps of:

g) providing an indication of initiation of a game when at least one player has performed step (a);

h) covering the chip or coin wagered during step (b) responsive to the indication provided at step (f);

i) dealing each player who has performed at least step (a) and the dealer with a given number of cards;

j) paying off winning players and removing all wagers made at step (a) for all losing players;

k) providing a Loss button at each player's position; and l) operating a Loss button at a player's position of a player who has performed step (b) and has lost a game; and m) removing the display of the player whose Loss button was operated at step (l) and removing the wager made by said player during step (b).

36. The method of claim 19 wherein the game of chance is roulette and further including the steps of:

g) providing an indication of initiation of a game when at least one player has performed step (a);

h) covering the chip or coin wagered during step (b) responsive to the indication provided at step (f);

i) operating a roulette wheel;

j) paying off winning players and removing all wagers made at step (a) for all losing players;

k) providing a Loss button at each player's position;

l) operating a Loss button at a player's position of a player who has performed step (b) and has lost a game; and m) removing the display of the player whose Loss button was operated at step (l) and removing the wager made by said player during step (b).

37. A method of playing a game of chance utilizing four (4) betting chips of different denominations, a weight of each different chip denomination being different from a weight of every other chip denomination, said method comprising the steps of:

a) at least one player wagering a chip necessary to play the game;

b) determining the weight of the chip wagered at step (a);

c) converting the weight at step (b) to a monetary value which correctly indicates a total monetary value even when the chips being weighed are of different denominations and hence different weights; and d) storing the monetary value for subsequent analysis.

38. The method of claim 37 further comprising transferring the stored values to a remote location through a communication link.

39. The betting system of claim 37 wherein a number of chips that may be weighed at one time is no greater than twenty-five (25).

40. The betting system of claim 37 wherein a number of chips that may be weighed at one time is preferably greater than four (4).

41. Betting apparatus, comprising:

a predetermined number of betting chips each representing different monetary values, the weight of each chip of a given monetary value being different from the weight of every other chip of different monetary value;

a chip receptacle;

means for detecting a presence and a weight of a chip placed in said receptacle;

means responsive to said weight detecting means for determining a monetary value associated with said weight;

display means and means for operating said display means to select a given number of consecutive wins from a permissible range of numbers;

controller means responsive to said means for operating and a denomination of a chip in said chip receptacle for generating a payoff amount;

display means for displaying a number of consecutive games won and payoff amount; and means responsive to initiation of a game of chance associated with the betting apparatus for preventing the number of consecutive wins, the amount of the bet and payoff being changed until either a game is lost before the selected number of consecutive wins is attained or the number of games won equals the number of consecutive wins selected.

42. The apparatus of claim 41 further comprising a second device for receiving one or more chips representing a conventional bet;

means for detecting the presence and weight of a chip placed on said second chip device;

means responsive to said weight detecting means for determining a monetary value associated with said weight; and means for accumulating said monetary bet values for subsequent analysis.

43. The apparatus of claim 41 wherein at least two chips are placed in said receptacle, said means for weighing includes means for sequentially determining the weight of each chip.

44. The apparatus of claim 43 wherein said monetary determining means further includes means for summing the monetary values of said at least two chips.

45. In combination, chips representing monetary values and weighing apparatus for receiving one or more chips to determine their total monetary values, comprising:

said chips each having a weight representing a given monetary value, a weight of chips of a given monetary value being different from a weight of chips of a different monetary value; and wherein a total weight of chips of a given monetary value which equals the monetary value of a higher monetary value chip is different from a weight of a single chip of said higher monetary values;

a device for receiving at least one chip;

means for detecting a presence and a weight of at least one chip placed upon said detecting and weighing means;

means responsive to said weight detecting means for determining a monetary value associated with said weight; and means for storing the monetary value for subsequent analysis.

46. The combination of claim 45 wherein all of said chips, regardless of weight, are the same size.

47. The combination of claim 45 wherein the weights of the chips are selected so that the total number of chips being weighed at one time can be only one monetary value.

48. The combination of claim 45 further comprising communication means for transferring values in said storing means to a remote location.

49. The combination of claim 45 further comprising:

means for receiving an identifying member possessed by a player inserting an identifying member into said means for receiving, said identifying member containing player data identifying the holder thereof, said means for receiving including means for storing said player data; and means for associating betting information stored in said storing means with the player data of the player who developed said betting information.

50. The combination of claim 49 wherein said identifying member has a magnetic surface for storing player data.

51. The combination of claim 50 wherein said means for receiving includes means for reading player data stored in said magnetic surface.

52. The combination of claim 45 further comprising means at each player's location for receiving a progressive jackpot bet; and communication means for coupling all tables within a given region participating in said progressive jackpot bet to transfer betting information and consecutive win information relating to the progressive jackpot bet to a given location for monitoring and controlling the progressive jackpot bet.

53. The combination of claim 52 wherein said means for receiving a progressive jackpot bet comprises a progressive jackpot recess and sensing means for sensing a presence of a chip in said progressive jackpot recess.

54. A betting unit comprising:

a chip receptacle;

a transparent cover moveable between a first position above said chip receptacle and second position displaced from said chip receptacle;

a housing for said chip receptacle having an opening above said chip receptacle and a surrounding marginal lip extending inwardly from said opening;

elevator means for movably supporting said chip receptacle between an upper and a lower position respectively closer to and further away from said housing opening;

drive means;

first means responsive to operation of said drive means for moving said cover between said first and second positions;

second means responsive to operation of said drive means for moving said elevator means between said upper and lower positions, said first and second means being so interrelated as to lower said chip receptacle when said cover is being moved to said first position, raise said elevator when said cover reaches said first position, to press a marginal notch in said cover into engagement with the marginal lip of the housing and lower the elevator to provide clearance for said cover when being moved from said first position to said second position; and said chip receptacle including a weighing sensor for determining a weight of one or more betting chips placed thereon, said weighing sensor comprising means for accurately determining the weight of said betting chips employed in said system when said chips comprise a predetermined number of different denominations, each denomination having a weight which is different from every other denomination and being selected so that no combination of betting chips have a total weight range which equals the weight of any one betting chip whereby a weight determined by said weighing means accurately indicates a total monetary value of the chips on said weighting means and wherein the range of weights of the betting chips are further selected so that a first group of chips whose denominations total a given monetary value has a total weight which is less than a total weight of a second group of betting chips whose total monetary value is equal to said given monetary value and wherein said second group comprises a greater number of betting chips than said first group.

55. The chip receptacle of claim 54 wherein the chip receptacle is a recess generally conforming to a shape of perimeter of a chip for accommodating a chip, said sensor having a member protruding through an opening at a bottom of the recess for sensing weight of a chip in said recess.

56. The chip receptacle of claim 55 wherein said receptacle has an extended finger-receiving portion to facilitate removal of a chip from said recess.

57. The chip receptacle of claim 54 wherein said chip receptacle has a plurality of recesses each for receiving a chip, said weighing sensor comprising a plurality of sensor members provided for each of said recesses to determine a chip weight of a chip in each recess.

58. A chip receptacle according to claim 54 further comprising:

means for operating said sensor at periodic intervals during a play of a game and means for providing an alert signal when a difference between two successive weighings is greater than a given value.

59. A chip receptacle for use in a betting apparatus for proving a bet in a game of chance, comprising:

a housing having an opening;

a chip receptacle mounted in said housing and beneath said opening;

elevator means for raising and lowering said chip receptacle;

a carrier frame moveable between a fist position between said chip receptacle and said opening and a second position displaced therefrom, the path of movement of said carrier being substantially perpendicular to the path of movement of said elevator means;

a transparent cover supported by and moveable with said carrier;

a drive source;

first means responsive to said drive source for moving said carrier between said first and second positions;

second means moveable by said drive source for raising and lowering said elevator means, whereby said elevator means is lowered when said carrier moves from said second position towards said first position and is thereafter raised to lift said cover from said carrier and urge a central portion of said carrier into said opening when said carrier has reached said second position; and said chip receptacle having a weighing sensor for determining a weight of one or more betting chips placed thereon, said weighing sensor comprising means for accurately determining the weight of said betting chips employed in said system when said chips comprise a predetermined number of different denominations, each denomination having a weight which is different from every other denomination and being selected so that no combination of betting chips have a total weight range which equals the weight of any one betting chip whereby a weight determined by said weighing means accurately indicates a total monetary value of the chips on said weighing means and wherein the range of weights of the betting chips are further selected so that a first group of chips whose denominations total a given monetary value has a total weight which is less than a total weight of a second group of betting chips whose total monetary value is equal to said given monetary value and wherein said second group comprises a greater number of betting chips than said first group.

60. A method of incorporating one of a consecutive win (or loss) side bet into a game of chance utilizing betting chips of different denominations, a weight of each different chip denomination being different from weight of every other chip denomination, said method comprising the steps of:

(a) at least one player wagering at least one chip to participate in the game of chance;

(b) said player making the wager of step (a) further wagering at least one chip or said side bet;

(c) determining the weight of the chip wagered at step (b);

(d) converting the weight determined in step (c) to a monetary value;

(e) presenting a payoff amount according to a number of consecutive wins (or losses) achieved by the player making the bet and based on pre-programmed payoff odds which correspond to number of consecutive wins (or losses); and (f) paying the player when the player has achieved a number of consecutive wins (or losses) regardless of whether the player has selected a specific number of consecutive wins at a predetermined payoff amount or is attempting to win without pre-selecting a given number of wins for a payoff determined by the number of consecutive wins rather than having any relationship to a predetermined number of wins selected by the player; and (g) associating a marker with the side bet made by the player each time the player making he side bet at step (b) achieves another consecutive win (or loss) to identify the current number of wins (or losses);

wherein the weight of said chips in step (a) and (b) are determined by a weighing sensor comprising means for accurately determining the weight of said betting chips employed in said system when said chips comprise a predetermined number of different denominations, each denomination having a weight which is different from every other denomination and being selected so that no combination of betting chips have a total weight range which equals the weight of any one betting chip whereby a weight determined by said weighing means accurately indicates a total monetary value of the chips on said weighing means and wherein the range of weights of the betting chips are further selected so that a first group of chips whose denominations total a given monetary value has a total weight which is less than a total weight of a second group of betting chips whose total monetary value is equal to said given monetary value and wherein said second group comprises a greater number of betting chips than said first group.

61. The method of claim 60 further comprising: (g) placing a marker upon the side bet each time a player making the side bet at step (b) achieves another consecutive win (or loss).

* * * * *